US011417033B2

(12) United States Patent
Martin et al.

(10) Patent No.: US 11,417,033 B2
(45) Date of Patent: Aug. 16, 2022

(54) APPLYING COLORS ON TEXTURES

(71) Applicant: Adobe Inc., San Jose, CA (US)

(72) Inventors: Rosalie Martin, Lyons (FR); Baptiste Manteau, Lyons (FR); Jeremy Levallois, Lyons (FR)

(73) Assignee: Adobe Inc., San Jose, CA (US)

( * ) Notice: Subject to any disclaimer, the term of this patent is extended or adjusted under 35 U.S.C. 154(b) by 104 days.

(21) Appl. No.: 16/443,263

(22) Filed: Jun. 17, 2019

(65) Prior Publication Data
US 2019/0385344 A1 Dec. 19, 2019

(30) Foreign Application Priority Data

Jun. 19, 2018 (FR) ..................................... 18/00634

(51) Int. Cl.
*G06T 11/00* (2006.01)
(52) U.S. Cl.
CPC .................................. *G06T 11/001* (2013.01)
(58) Field of Classification Search
None
See application file for complete search history.

(56) References Cited

U.S. PATENT DOCUMENTS

| | | | | |
|---|---|---|---|---|
| 8,041,111 B1* | 10/2011 | Wilensky | ................... | G06T 7/90 345/589 |
| 2009/0010533 A1* | 1/2009 | Hung | ................... | H04N 19/182 382/166 |
| 2012/0075329 A1* | 3/2012 | Skaff | ........................ | G09G 5/06 345/593 |
| 2013/0187940 A1* | 7/2013 | Damez | .................. | G06T 11/001 345/582 |
| 2014/0037200 A1* | 2/2014 | Phillips | ..................... | G06T 7/90 382/162 |
| 2015/0366293 A1* | 12/2015 | Clarkson | .................. | A43B 1/04 703/1 |
| 2017/0228895 A1* | 8/2017 | Lee | .................. | H04N 21/44008 |
| 2018/0005409 A1* | 1/2018 | Aksoy | ................... | G06T 11/001 |

OTHER PUBLICATIONS

Rutten, Aaron, "How to Extract a Color Palette from a Photo", published at https://www.youtube.com/watch?v=eE5jntHD638 on YouTube as of Aug. 30, 2013, total time 2:19 (Year: 2013).*

(Continued)

*Primary Examiner* — William A Beutel
(74) *Attorney, Agent, or Firm* — Keller Preece PLLC

(57) ABSTRACT

Systems, methods, and non-transitory computer-readable media are disclosed for extracting colors of an input image and applying such colors to a procedural texture to modify the procedural texture. For instance, the disclosed systems can extract one or more colors from an input image to generate a color palette that represents colors that are generally visually noticeable to human eyes. Furthermore, the disclosed systems can apply colors from the color palette to a target procedural texture to modify the target procedural texture to represent the colors of the color palette. Moreover, the disclosed systems can display generated color palettes and modified procedural textures/materials in a graphical user interface.

20 Claims, 19 Drawing Sheets

(56) References Cited

OTHER PUBLICATIONS

Jussi Jantunen: "Creating Procedural Textures for Games—with Substance Designer," Bachelor's thesis; Turku University of Applied Sciences; Jun. 20, 2017; https://www.theseus.fi/bitstream/handle/10024/132562/JantunenJussi.pdf?sequence=1.
Ali Jahanian et al: "Autonomous color theme extraction from images using saliency", Proceedings of SPIE Medical Imaging 1997, vol. 9408, Mar. 6, 2015, p. 940807, XP055585867, 1000 20th St. Bellingham, WA 98225-6705USA ISSN: 0277-786X, DOI: 10.1117/12.2084051 ISBN: 978-1-5106-2781-9.
Reinhard, Erik; "Color transfer between images", IEEE Computer Graphics and Applications, vol. 21, No. 4, Jan. 1, 2001, p. 34, XP055011470, ISSN: 0272-1716, DOI: 10.1109/38.946629.
Search Report as received in French application FR1800634 dated May 7, 2019.
Written Opinion as received in French application FR1800634 dated Jun. 19, 2018, No English translation provided.

\* cited by examiner

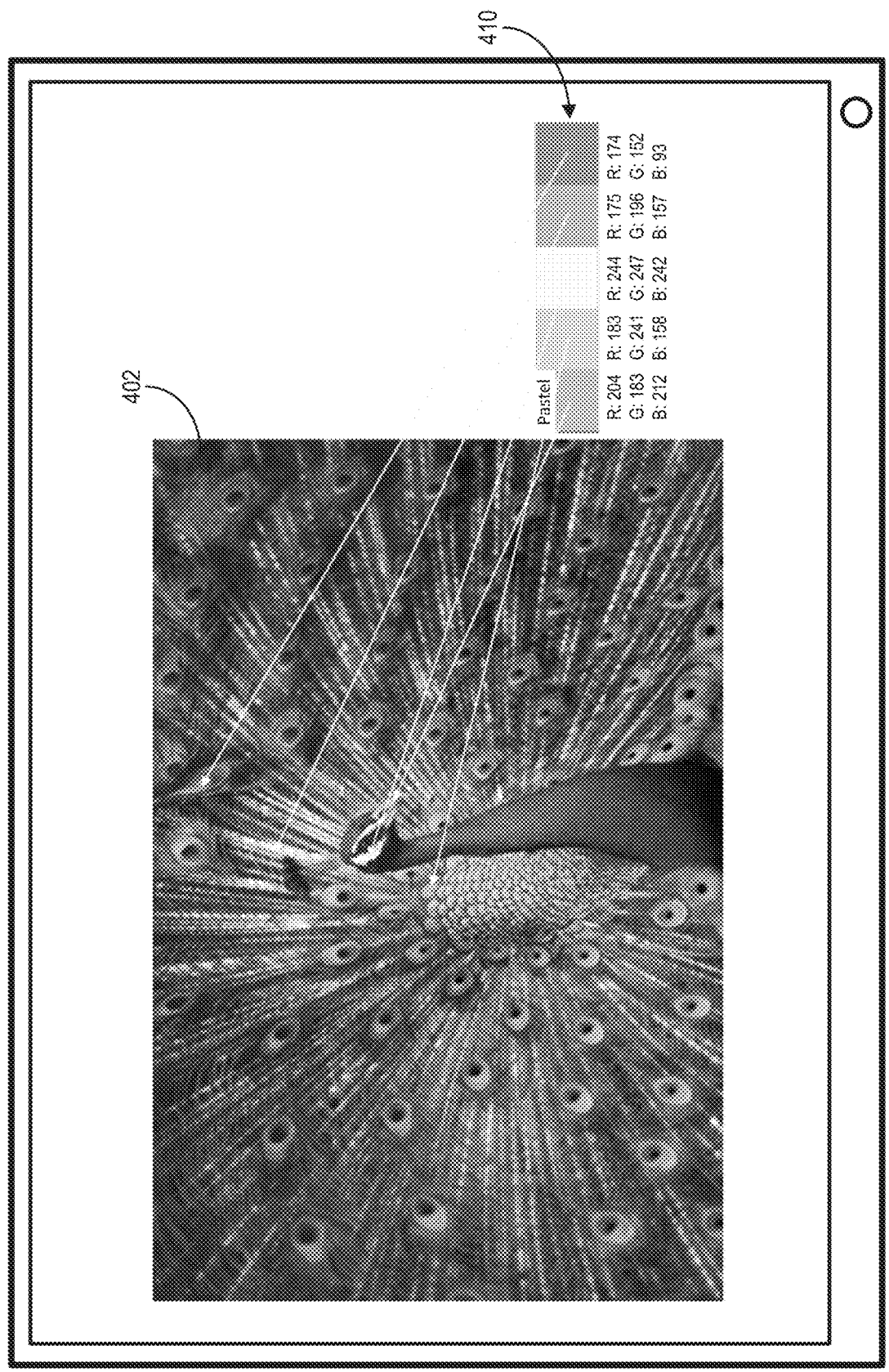

APPLYING COLORS ON TEXTURES

CROSS REFERENCE TO RELATED APPLICATIONS

This application claims the benefit of, and priority to, French patent application number FR/18/00634 filed on Jun. 19, 2018. The entire contents of the foregoing patent application are hereby incorporated by reference.

BACKGROUND

Recent years have seen a rapid increase in the use of computer graphics to create digital content. In particular, individuals and businesses increasingly utilize, create, modify, and/or view digital content generated using computer graphics techniques (e.g., video games, videos such as animated films, and/or object libraries used in software tools of architecture, industrial design). One way in which computer graphics has recently advanced is the use of materials and textures that provide computer-generated objects and environments with realistic appearances.

Recent advancements in textures include procedural textures. Procedural textures are created using algorithms rather than conventional capture-based textures (i.e., images). Procedural textures provide various advantages over conventional capture-based textures. For example, procedural textures have smaller file sizes that result in low storages costs. Furthermore, procedural textures are resolution independent. In other words, the resolution of a procedural texture is not determined by a resolution of a bitmap image and can be adjusted or increased on demand. Finally, procedural textures allow for more efficient texture mapping.

Unfortunately, given that procedural textures are based on algorithms they are inherently more complex than capture-based texture. The complexity of procedural textures means that very few computer-graphic artists have the ability to create or modify procedural textures. Indeed, modifying procedural textures using conventional systems requires computer-graphic artists to work with purely mathematical parameters, which are typically not intuitive. As such, modifying procedural textures using conventional systems is typically a lengthy, tedious, and complex process.

Given the foregoing, computer-graphic artists, particularly novice artists, typically must use existing procedural textures in pre-generated libraries or use capture-based textures. Existing procedural textures can be limited, ill-suited for a particular project, or otherwise unsatisfactory. Furthermore, the use of existing procedural textures results in limited flexibility in designing and can stymie artistic creativity. On the other hand, using capture-based textures results in the need for more computing resources, limited resolution, and less efficient texture mapping and rendering.

SUMMARY

This disclosure describes one or more embodiments that provide benefits with systems, computer-readable media, and methods that allow for efficient, flexible, and intuitive modification of procedural textures and procedural materials. More specifically, in one or more embodiments, the disclosed systems provides for integration of procedural and capture-based textures during texture modification and creation. For example, one or more embodiments, allow for modification of a procedural texture based on a captured image. In particular, one or more embodiments can accurately and efficiently extract colors from an image and apply those colors to a procedural texture to generate a variation of the procedural texture. In particular, the disclosed systems can generate a color palette from an image and apply the color palette to a procedural texture. For instance, the disclosed systems can extract colors from an image based on a selected color property. Furthermore, the disclosed systems can modify a procedural texture by applying colors of the generated color palette to the procedural texture or an associated procedural material. Additionally, the disclosed systems can display the input image, the generated color palette, and the varied procedural texture/material in a graphical user interface. In this manner, the disclosed systems provide an efficient procedural texture modification tool that allows for efficient, flexible, and intuitive modification and visualization of procedural textures and materials.

For example, in order to modify a target procedural texture, in one or more embodiments, the disclosed systems receive an input image. In addition, the disclosed systems can extract one or more colors from the input image to generate a color palette. The disclosed systems can then apply at least one color from the color palette to a target procedural texture. Furthermore, the disclosed systems can display the target procedural texture with the applied at least one color from the color palette in the graphical user interface. The disclosed systems can then optionally apply the modified procedural texture to a procedural material and/or computer-generated object.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 4 and 5A-5F illustrate user interfaces displaying color palettes generated from an image in accordance with one or more embodiments.

DETAILED DESCRIPTION

Figure 1:
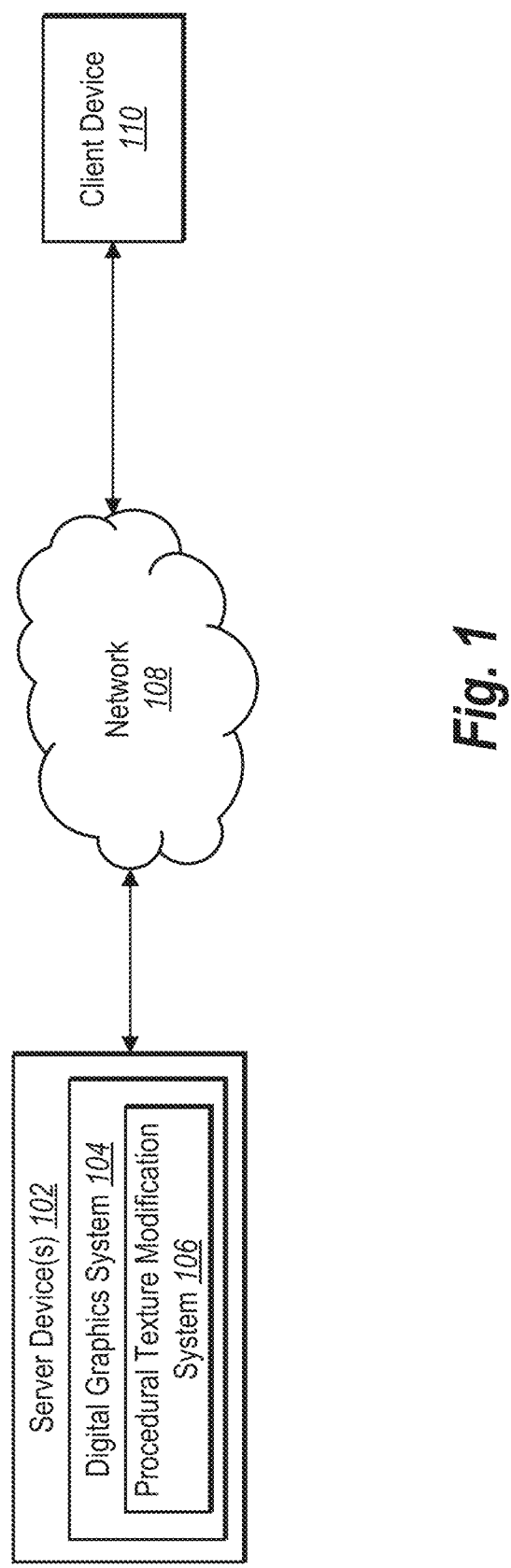
FIG. 1 illustrates a schematic diagram of an example environment in which a procedural texture modification system can operate in accordance with one or more embodiments.

One or more embodiments of the present disclosure include a procedural texture modification system that can extract one or more colors from an input image to generate a color palette and apply colors from the color palette to a procedural texture to generate a new or modified procedural texture. In other words, the procedural texture modification system can modify a procedural texture using a color palette generated from a user selected image in a work interface for modifying procedural textures. Indeed, by generating a color palette from a user selected image and applying colors from the color palette to a target procedural texture, the procedural texture modification system can enable efficient and easy modification (and/or visualization) of a procedural texture using a variety of visual aspects (e.g., different color schemes and/or styles).

In one or more embodiments, the procedural texture modification system generates a color palette from an image. In particular, the procedural texture modification system can receive a user selected image and optionally a color property preference (e.g., a color palette type). Furthermore, the procedural texture modification system can quantify pixels of the image in a chromatic space to distribute them in color compartments. Moreover, the procedural texture modification system can assign weights to each color compartment and alter the weights according to the selected color property preference. Then, the procedural texture modification system can select N number of the highest weighted colors amongst the color compartments and generate the color palette from the selected colors. After selection of a color and prior to selecting a subsequent color for the color palette, the procedural texture modification system can alter the weights of the color compartments using distance values based on similarities between the selected color and the color compartments to promote color distinctiveness in the color palette.

Additionally, as previously mentioned, the procedural texture modification system can apply colors of the generated color palette to a target procedural texture. For instance, the procedural texture modification system can apply colors of the generated color palette to the target procedural texture using one of two application modes (e.g., a plurality of colors application mode and a single color application mode). In both application modes, the procedural texture modification system can apply one or more colors of the generated color palette to the target procedural texture to modify visual aspects of the target procedural texture.

For example, in the plurality of colors application mode, the procedural texture modification system can identify one or more colorimetric parameters from the target procedural texture (e.g., texture color parameters). Additionally, the procedural texture modification system can apply the colors of the color palette to the target procedural texture by mapping (or pairing) the colors of the color palette to the one or more texture color parameters of the target procedural texture (e.g., to replace the one or more texture color parameters). Furthermore, in the single color application mode, the procedural texture modification system can apply a single color from the color palette to affect the dominant color for the entire target procedural texture (e.g., modifying a dominant color present in the target procedural texture while leaving one or more other colors of the procedural texture unchanged). Indeed, the procedural texture modification system can apply each individual color from the color palette to the target procedural texture to generate multiple variations of the target procedural texture.

In addition, the procedural texture modification system can include a graphical user interface for texture modification. For instance, the procedural texture modification system can display the input image and one or more color palettes (e.g., visual representations of the color palettes) generated from the input image in the graphical user interface. Furthermore, the procedural texture modification system can also display the target procedural texture and one or more modified versions of the target procedural texture (e.g., as a modified texture mapping for a procedural material) resulting from an application of the one or more colors from the color palette.

As mentioned above, conventional systems have a number of shortcomings. In particular, conventional systems are often inaccurate, inflexible, and inefficient in regard to modifying textures, particularly procedural textures. Furthermore, while some conventional systems can extract colors from an image, these conventional systems often extract colors in an inflexible and inaccurate manner. In particular, conventional systems can oftentimes extract colors that do not accurately represent the colors from the image that are visually meaningful to a user. For example, many conventional systems have a tendency to extract only the most common colors present in an image (e.g., an average of colors present in an image). As such, conventional systems often extract colors that are common in an image, due to average values of colors in the image, however such colors are not always present in the image and, therefore, are not the colors that are perceived by a human. Furthermore, conventional digital graphics systems sometimes generate color palettes for an image by utilizing colors that may complement each other in the palette, however this often results in color palettes having mismatched color attributes (e.g., a dark color in a color palette meant for bright colors). Indeed, such conventional digital graphics systems often provide unpredictable color palettes.

The procedural texture modification system of one or more implementations of the present disclosure provides advantages and benefits over conventional systems and methods by generating, from an image, a color palette having the most perceptually visible and representative colors, applying colors from the color palette to a target procedural texture, and/or displaying the modified target procedural texture in a graphical user interface. For instance, the procedural texture modification system can accurately, easily, and/or efficiently modify (and display) a target procedural texture to present a user with a variety of color options for the target procedural texture. For example, the procedural texture modification system can extract colors from an image that accurately represent the colors visually perceptible to a human by extracting colors that are determined to have the most visual effect. The flexibility and intuitive manner of modifying procedural textures can inspire and enable creativity in creating and modifying procedural textures.

Moreover, the procedural texture modification system enables users to easily extract colors from an image (e.g., displayed as a generated color palette) and apply the colors to a procedural texture to modify visual aspects of the texture without having to implement tedious settings that may involve mathematical parameters. Indeed, the procedural texture modification system enables users to quickly and efficiently modify procedural textures using colors from an image. Thus, the procedural texture modification system can provide the ease and intuitive nature of capture-based textures with the computational efficiency provided by procedural textures.

In particular, the procedural texture modification system more efficiently utilizes computational resources to modify procedural textures in comparison to some conventional systems. For example, the procedural texture modification system reduces the number of steps a user takes to modify procedural textures (e.g., steps such as manual selection of colors, identification of where to apply the colors on a procedural texture, and/or working with mathematical parameters to modify procedural textures). Indeed, by reducing such steps, the procedural texture modification system utilizes less computational resources while modifying and displaying a texture in comparison to some conventional systems. Also, by reducing such steps, the procedural texture modification system enables a user to modify procedural textures in less time compared to some conventional systems.

As illustrated by the foregoing discussion, the present disclosure utilizes a variety of terms to describe features and advantages of the procedural texture modification system. Additional detail is now provided regarding the meaning of such terms. For example, as used herein, the term "image" (sometimes referred to as "digital image," "input image," and/or "inspirational image") can refer to any representation of a digital symbol, picture, icon, and/or illustration. In particular, the term "image" can refer to digital content that includes visual properties such as colorimetric parameters to represent and/or portray a symbol, picture, icon, and/or illustration. Moreover, the term "image" can refer to digital content utilized by a user to create a color palette as described below. The term "digital image" can include digital files with the following, or other, file extensions: JPG, TIFF, BMP, PNG, RAW, or PDF.

Moreover, as used herein, the term "color" can refer to a property belonging to digital content (e.g., an image, texture, etc.) that is generally determined based on hue, saturation, and/or brightness of light reflected corresponding to an image and/or texture. For example, the term "color" can include properties corresponding to an RGB color space, HSV color space and/or a CIELAB color space.

Additionally, as used herein, the term "color palette" can refer to a range of colors. In particular, the term "color palette" can refer to a range of colors from an image (or texture) that represent colors that are visually perceptible in the image (or texture). For instance, a color palette can include one or more colors extracted from an image in accordance with one or more embodiments herein.

As used herein, the term "color compartment" (sometimes referred to as "color bin") can refer to a collection of pixels and corresponding color parameters (e.g., color settings and/or colorimetric parameters) from an image. In particular, the term "color compartment" can refer to a collection of one or more quantified pixels from a L*a*b space corresponding to an image. For instance, a color compartment can include one or more colorimetric parameters (e.g., based on the L*a*b space) corresponding to one or more pixels of an image. As used herein, the term "colorimetric parameter" can refer to one or more values that represent the intensity and/or other attributes of a color. Indeed, the colorimetric parameter can include one or more values from a CIELAB color space such as a lightness value and one or more color channels (e.g., a green-red component and a blue-yellow component).

As used herein, the term "color property preference" (sometimes referred to as "color property") can refer to a preference for one or more properties and/or characteristics corresponding to visual aspects and/or tones corresponding to colors. In particular, the color property preference can include a selection of a color palette type. For instance, as used herein, the term "color palette type" (sometimes referred to as "color palette tone") can refer to one or more color properties that represent a specific tone within digital content. For example, a color palette type can include a selection of a color palette that follows a specific tone such as a representative color palette, pure color palette, bright color palette, pastel color palette, deep color palette, and/or a dark color palette.

As used herein, the term "distance" (sometimes referred to as "distance value") can refer to a value representing similarities between attributes of two or more characteristics and/or attributes. As an example, the procedural texture modification system distance value can determine distance values using a CIELAB Delta E 2000 calculation in accordance with one or more embodiments herein. In particular, the term "distance" can refer to a value that measures the similarity of two or more parameters of images and/or textures. For example, a distance can include a value that measures color similarity. Furthermore, as used herein, the term "color similarity" can refer to an indication of how similar and/or different two colors are in a color space. For instance, the color similarity between two colors can be based on similarities and/or differences measured by a distance value between attributes of the two colors (e.g., colorimetric parameters) in a color space.

As used herein, the term "texture" can refer to a digital representation of a surface of a graphical object. In particular, as used herein, the term "texture" can refer to a color map that corresponds to a surface of a graphical object. For example, a texture can include a color map of a surface (e.g., a material) of a graphical object (e.g., an object having graphical material properties). Furthermore, as used herein, the term "procedural texture" can refer to a texture that is created using a mathematical (and/or an algorithmic) description (e.g., a description utilized as instruction to render the procedural texture for display). In particular, the term "procedural texture" can refer to a texture that is created using mathematical descriptions (and/or instructions) rather than stored data (e.g., a bitmap image) to map onto materials and/or other graphical objects of varying sizes (e.g., a texture that is created at runtime rather than applied from stored data). For example, a procedural texture can include a texture that is created using a mathematical description that includes texture color parameters. As used herein, the term "texture color parameter" can refer to color settings and/or parameters of a procedural texture. For instance, the texture color parameters can include colorimetric parameters of a color map belonging to a procedural texture.

Moreover, as used herein, the term "material" can refer to a set of graphical properties that stimulate real-life materials on graphical objects (e.g., 3D modeling data). In particular, the term "material" can refer to a set of graphical properties that include a texture mapping, rendering parameters (e.g., a bidirectional reflectance distribution function), and/or physics behavioral properties (e.g., friction). For instance, a material can include a set of graphical properties that are applied to graphical objects such that the graphical objects stimulate real-life materials such as, but not limited to, wood, concrete, metal, glass, water, fabric, plastic (e.g., visually and physically). Furthermore, as used herein, the term "procedural material" can refer to a material that utilizes a procedural texture to visually present real-life materials on graphical object. In particular, the term "procedural material" can refer to a material that is created utilizing mathematical descriptions (e.g., texture mappings based on procedural textures, physics behavioral algorithms, rendering parameters such as BRDF) to produce visual and physical properties of graphical objects.

As used herein, the term "color space characteristic" can refer to one or more characteristics and/or values belonging to a color space model. For instance, the term "color space characteristic" can refer to characteristics and/or values belonging to an HSV model, RGB model, CMYK model, and/or CIELAB model. For example, a color space characteristic can include a hue characteristic and/or a brightness characteristic. As used herein, the term "hue characteristic" can refer to a hue value from a color space. For example, a hue characteristic can include a value between 0 degrees and 360 degrees in an HSV model. Furthermore, as used herein, the term "brightness characteristic" can refer to a brightness value from a color space. For example, a brightness characteristic can include a value between 0 percent and a 100 percent in an HSV model.

As used herein, the term "color representativeness" can refer to a measure of occurrence of similar color attributes (e.g., a colorimetric parameter) within an image and/or texture. In particular, the term "color representativeness" can refer to a measure of how often pixels of an image (and/or parameters of a texture) are similar to a given color (and/or colorimetric parameter of the color). Determining color representativeness for a color compartment, color, and/or texture color parameter in regard to an image and/or texture is described in greater detail in the figures below.

Turning now to the figures, FIG. 1 illustrates a schematic diagram of one embodiment of an exemplary environment 100 in which a procedural texture modification system 106 can operate. As illustrated in FIG. 1, the exemplary environment 100 includes server device(s) 102, a network 108, and a client device 110. As further illustrated in FIG. 1, the server device(s) 102 and the client device 110 can communicate via the network 108. Although FIG. 1 illustrates the server device(s) 102 and the client device 110 communicating via the network 108, the various components of the environment 100 can communicate and/or interact via other methods (e.g., the server device(s) 102 and the client device 110 can communicate directly). Furthermore, although FIG. 1 illustrates the procedural texture modification system 106 being implemented by a particular component and/or device within the environment 100, the procedural texture modification system 106 can be implemented, in whole or in part, by other computing devices and/or components in the environment 100 (e.g., on the client device 110).

As shown in FIG. 1, the server device(s) 102 can include a digital graphics system 104 which further includes the procedural texture modification system 106. In particular, the procedural texture modification system 106 can generate color palettes from images in accordance with one or more embodiments herein. Furthermore, the procedural texture modification system 106 can modify procedural textures by applying colors from a color palette to a target procedural texture in accordance with one or more embodiments herein. Additionally, the procedural texture modification system 106 can provide, for display, images, generated color palettes, and/or modified procedural textures in accordance with one or more embodiments herein. Furthermore, the server device(s) 102 (e.g., via the procedural texture modification system 106) can store digital content (e.g., digital images), one or more generated color palettes, one or more procedural textures, one or more procedural materials, one or more modified procedural textures, and/or one or more modified procedural materials. Additionally, the server device(s) 102 (e.g., via the procedural texture modification system 106) can provide digital content (e.g., digital images), one or more generated color palettes, one or more textures, one or more procedural materials, one or more modified procedural textures, and/or one or more modified procedural materials to a client device 110. Moreover, the server device(s) 102 can include a variety of types of computing devices, including those explained below with reference to FIG. 12.

Furthermore, as mentioned above and as shown in FIG. 1, the environment 100 includes the client device 110. In one or more embodiments, the client device 110 may include, but is not limited to, a mobile device (e.g., smartphone, tablet), a laptop, a desktop, or any other type of computing device, including those explained below with reference to FIG. 12. Furthermore, although not shown in FIG. 1, the client device 110 can be operated by a user to perform a variety of functions. In particular, the client device 110 can perform functions such as, but not limited to, creating, storing, uploading, and/or modifying a variety of digital content items (e.g., a digital image), color palettes, and/or textures. For example, the client device 110 can communicate with the server device(s) 102 via the network 108 to provide one or more digital images to the server device(s) 102. Additionally, the client device 110 can select digital images (and/or color property preferences) on the server device(s) 102 to generate color palettes from the digital images and/or save the color palettes (e.g., via the procedural texture modification system 106). Furthermore, the client device 110 can utilize color palettes to modify procedural textures/materials and/or save the modified procedural textures/materials (e.g., via the procedural texture modification system 106 on the server device(s) 102). Although FIG. 1 illustrates the procedural texture modification system 106 on the server device(s) 102, the procedural texture modification system 106 can be implemented on the client device 110. Furthermore, although FIG. 1 illustrates the environment with the client device 110, the environment 100 can include a plurality of client devices.

Additionally, as shown in FIG. 1, the exemplary environment 100 includes the network 108. As mentioned above, the network 108 can enable communication between components of the environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the client device 110, and the network 108 may communicate using any communication platforms and technologies suitable for transporting data and/or communication signals, including any known communication technologies, devices, media, and protocols supportive of data communications, examples of which are described with reference to FIG. 12.

As mentioned above, the procedural texture modification system 106 can extract one or more colors from an input image to generate a color palette and apply colors from the color palette to a target procedural texture/material. Furthermore, as mentioned above, the procedural texture modification system 106 can display the color palette and the target procedural texture/material in a graphical user interface. For instance, FIGS. 2A-2C illustrate graphical user interfaces, of the procedural texture modification system 106, showing a workflow of generating a color palette from an image and modifying a procedural texture/material with the color palette.

Figure 2A:
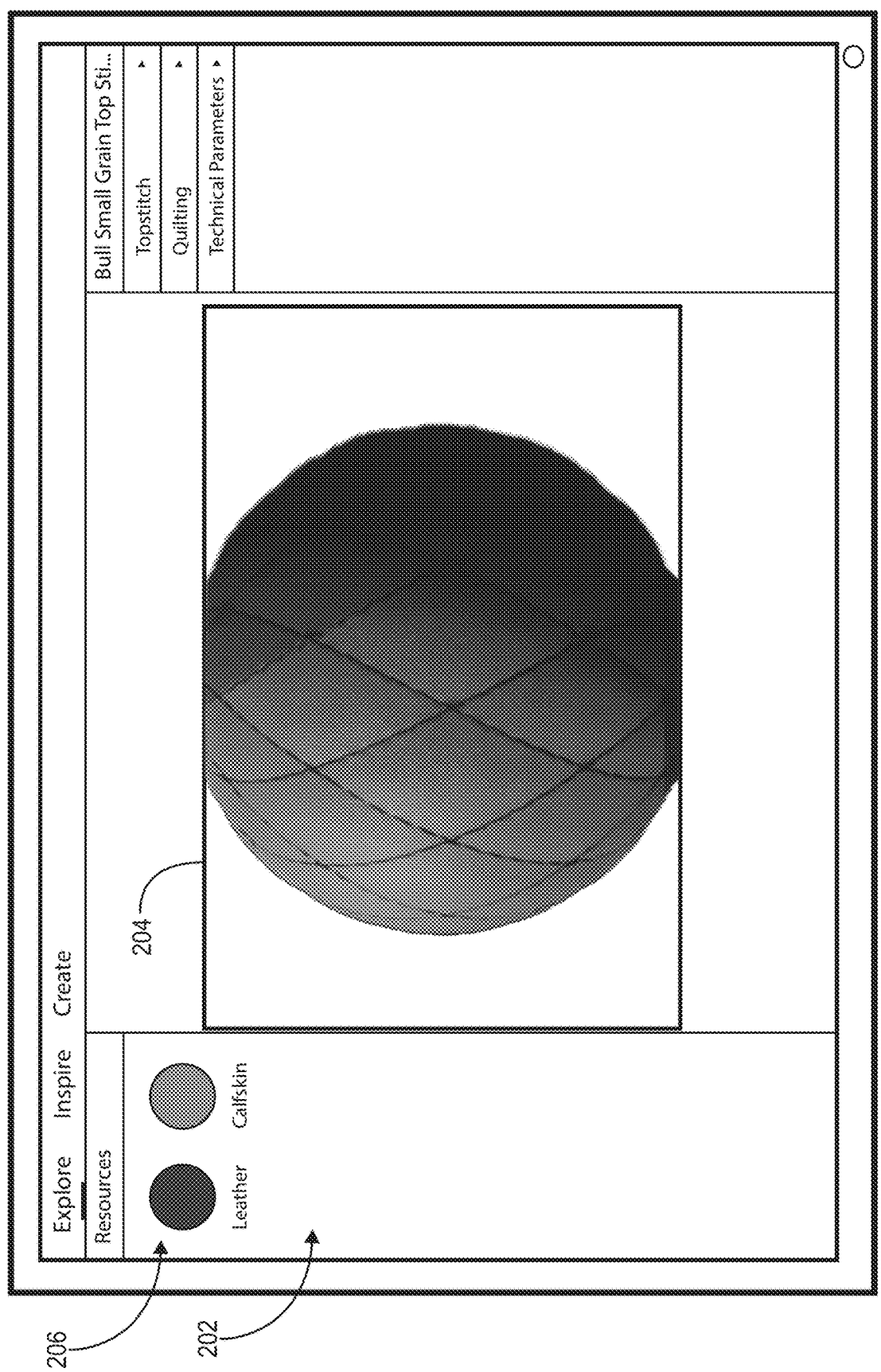
FIGS. 2A-2C illustrate graphical user interfaces showing a workflow of generating a color palette from an image and modifying a procedural texture with the color palette in accordance with one or more embodiments.

For instance, as shown in FIG. 2A, the procedural texture modification system 106 can receive a target procedural material in a graphical user interface 202. In particular, as shown in FIG. 2A, the procedural texture modification system 106 can enable a user to select a target procedural material from a resources menu 206 (e.g., a leather material and a calfskin material). Moreover, as illustrated in FIG. 2A, the procedural texture modification system can display a graphical object with the selected target procedural material (e.g., a graphical object having a leather based procedural material) as the target procedural material 204.

Figure 2B:
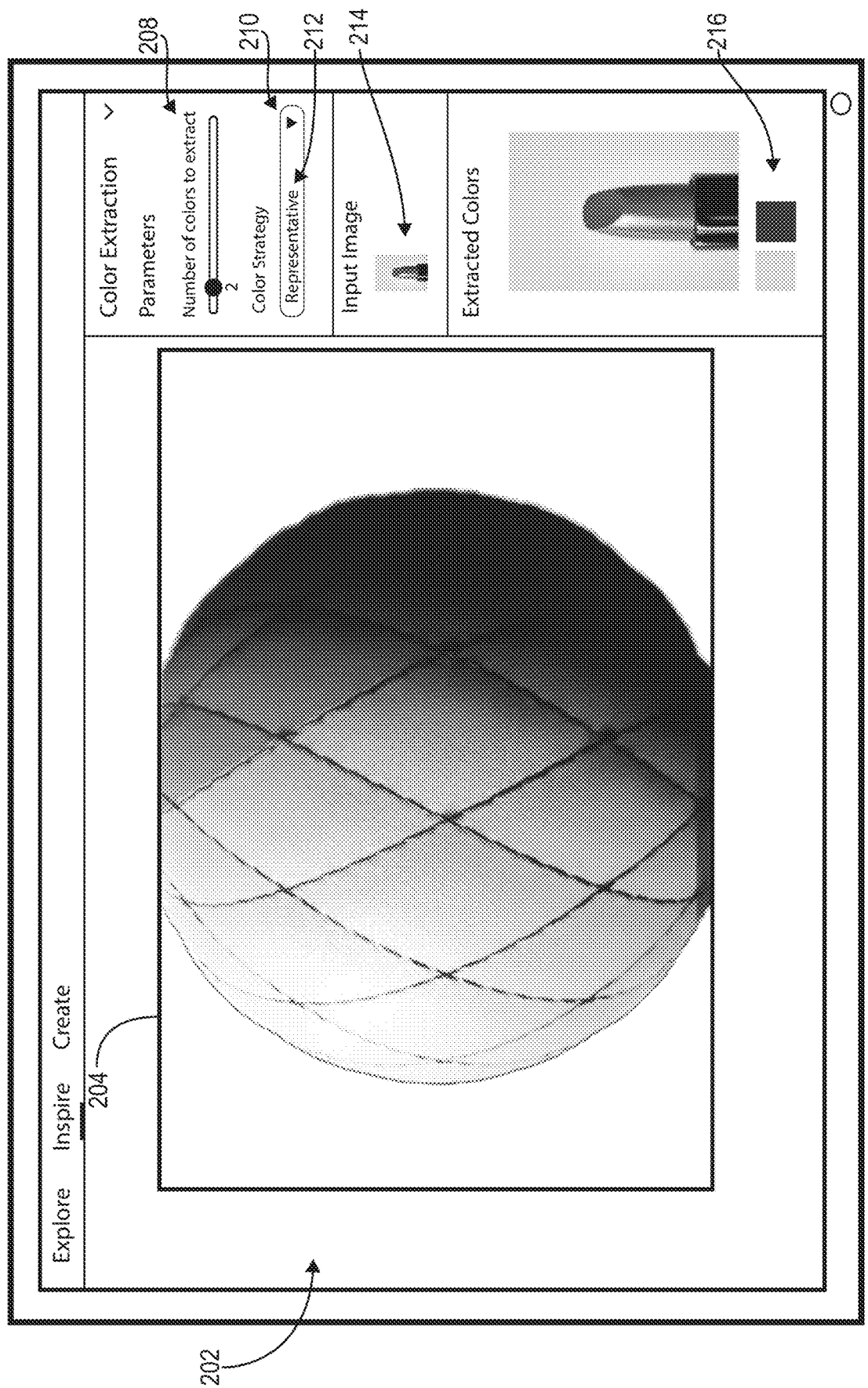
Figure 2C:
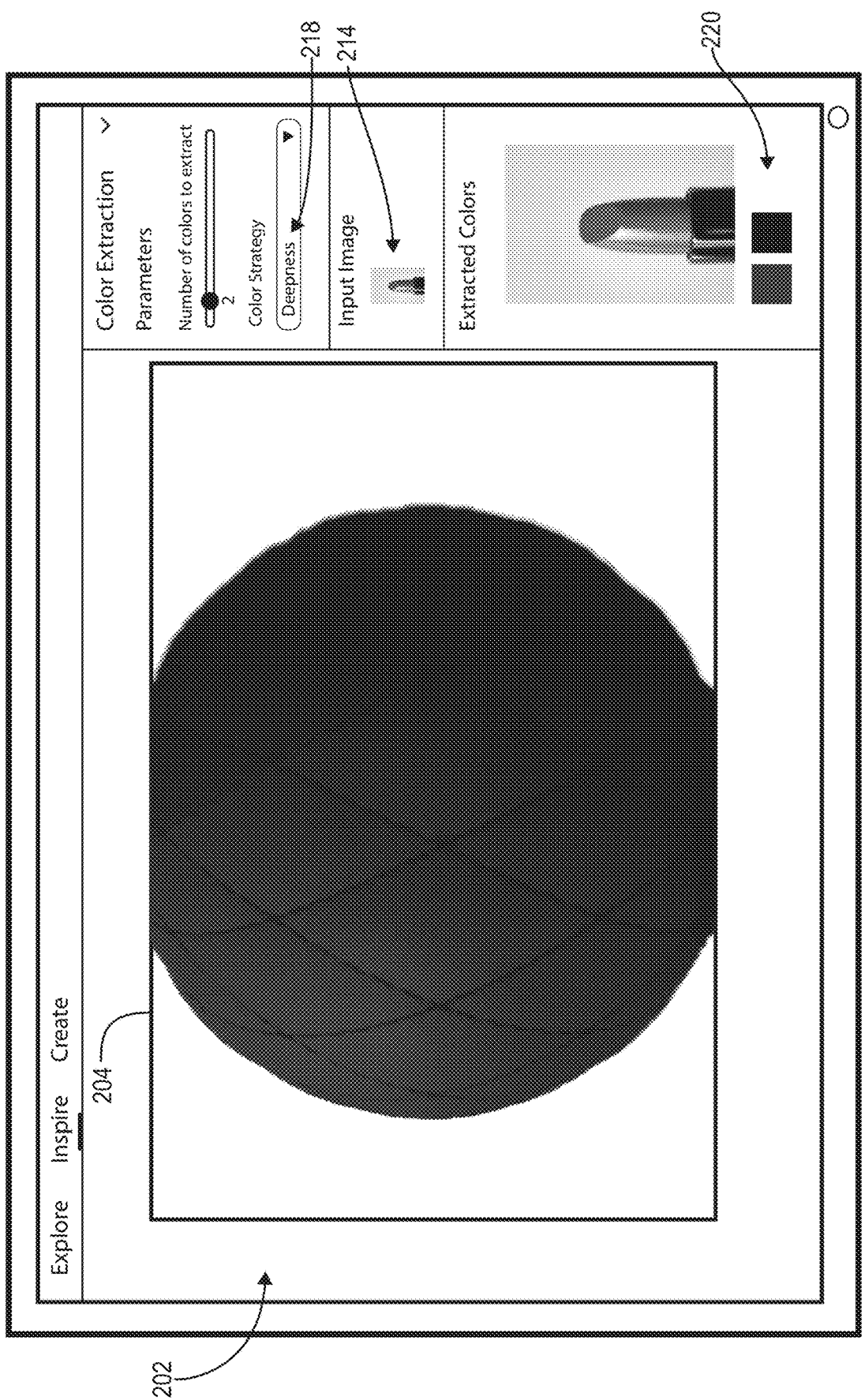

Then, as shown in FIG. 2B, the procedural texture modification system 106 can receive an input image 214 from a user in the graphical user interface 202. For example, the procedural texture modification system 106 can enable a user to select a digital image available on a client device (e.g., locally or on cloud storage) and/or a digital image from a repository (e.g., Adobe Stock). More particularly, the procedural texture modification system 106 allows a user to explore various images for inspiration to change or modify the target procedural material 204. As shown in FIG. 2B, the user has selected an input image 214 of lipstick.

Furthermore, as illustrated in FIG. 2B, the procedural texture modification system 106 can receive other parameters such as a number of colors to extract 208 (e.g., N selected colors) and a color strategy 210 (e.g., a color palette type) from a user (described in greater detail in the figures below). Indeed, the procedural texture modification system 106 can utilize the input image 214, the number of colors to extract 208, and a color strategy 210 to modify the target procedural material 204 (e.g., by modifying a procedural texture of the target procedural material 204).

For example, as shown in FIG. 2B, the procedural texture modification system 106 can generate and display a color palette 216 (e.g., a color palette corresponding to the input image 214 based on the color strategy 210 of a representative color palette type 212). As shown the procedural texture modification system 106 can extract two colors form the input image 214 corresponding to the most representative (e.g., most used on a pixel basis). In particular, as shown, the procedural texture modification system 106 has extracted the peach color from the background of the image 214 and a red color from the lipstick. Furthermore, as shown in FIG. 2B, the procedural texture modification system 106 can apply the colors from the color palette 216 to a target procedural texture belonging to the target procedural material 204 (e.g., the separate colors from the color palette 216 are applied to the distinctive texture colors of the target procedural material 204). Indeed, as shown in FIG. 2B, the procedural texture modification system 106 can modify the target procedural material 204 by modifying a target procedural texture of the material to include the colors present in the color palette 216. Moreover, as illustrated in FIG. 2B, the procedural texture modification system 106 modifies the target procedural material 204 by changing colors of the target procedural texture of the target procedural material 204 while maintaining other material properties (e.g., lighting, shading, surface properties of the material). In particular, the procedural texture modification system 106 changed the color of the leather to match the color of the background from the input image 214 and the color of the threads to match the color of the lipstick from the input image 214.

Additionally, the procedural texture modification system 106 can enable a user to select another color strategy (e.g., another color palette type), generate an additional color palette, and further modify a target procedural material based on the additional color palette. In particular, in many use cases, an artist may not be interested in the most representative colors from an image. Rather the artist may desire to use deepest or more visually striking colors. For instance, as shown in FIG. 2C, the procedural texture modification system 106 can receive a color strategy selection of a deepness color palette type 218 (i.e., a deep color palette type) in the graphical user interface 202. Then, as shown in FIG. 2C, the procedural texture modification system 106 can generate an additional color palette 220 based on the input image 214 and the selected deepness color palette type 218. More specifically, the procedural texture modification system 106 can extract the color from the lipstick and the color from the lipstick casing.

Additionally, as illustrated in FIG. 2C, the procedural texture modification system 106 can modify the target procedural material 204 by modifying the target procedural texture of the material to include the colors present in the additional color palette 220 (e.g., to match the colors of the lipstick and lipstick casing portrayed in the input image rather than the background of the input image as in the color palette 216). Thus, the procedural texture modification system 106 can allow a user to explore different images, different numbers of extracted colors, and different color palette types in order to generate an inspiring or creative procedural texture/material. Furthermore, the procedural texture modification system 106 can allow for this flexible, intuitive, and efficient modification of procedural textures without requiring an artist to understand or modify the algorithms or parameters underlying the procedural texture/material. A more detailed description of the procedural texture modification system 106 generating and displaying a color palette from an input image is discussed in reference to FIGS. 3, 4, and 5A-5F. Furthermore, a more detailed description of the procedural texture modification system 106 applying colors of a color palette to a target procedural texture and displaying one or more modified target procedural textures/materials is discussed in reference to FIGS. 6, 7, and 8.

Figure 3:
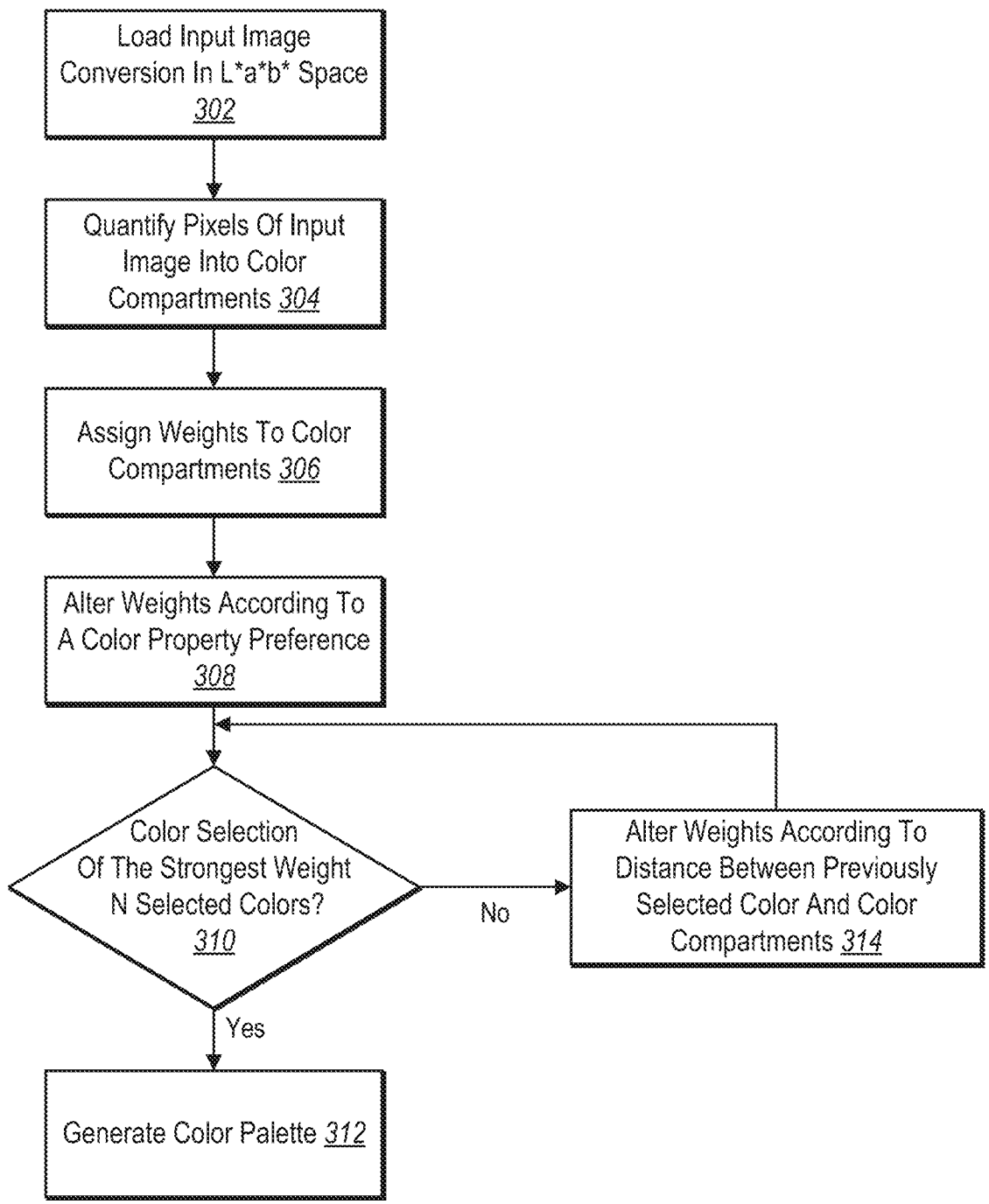
FIG. 3 illustrates a state diagram of generating a color palette from an image in accordance with one or more embodiments.

As mentioned above, the procedural texture modification system 106 can generate a color palette from a digital image. For instance, FIG. 3 illustrates a state diagram of the procedural texture modification system 106 generating a color palette from a digital image. In particular, FIG. 3 illustrates the procedural texture modification system 106 converting a digital image into a chromatic space (in an act 302), quantifying pixels of the digital image into color compartments (in an act 304), assigning and altering weights for each color compartment (in acts 306 and 308), and selecting colors from the highest weighted color compartments to generate a color palette (in acts 310, 312, and 314). Furthermore, FIG. 3 also illustrates the procedural texture modification system 106 excluding neighbor compartments of a selected color prior to selecting a subsequent color for the color palette and scheduling the selected colors of the color palette (in acts 310, 312, and 314).

For instance, as described above, the procedural texture modification system 106 can load an input image. Furthermore, the procedural texture modification system 106 can also receive a selection for a color property preference. For instance, the procedural texture modification system 106 can utilize the selected color property preference to affect the tone (and/or other characteristics) of the colors extracted for the color palette by changing the way in which color compartments are created for the image, weights are assigned to color compartments, and/or weights are altered for the color compartments. For example, the color property preferences can include a selection of a color palette type such as a representative color palette, a pure color palette, a bright color palette, a pastel color palette, a deep color palette, and/or a dark color palette. Additionally, the procedural texture modification system 106 can enable a user to select a number of colors that should be selected for the color palette. Furthermore, in some embodiments, the procedural texture modification system 106 defaults (or utilizes) a color property preference when a color property preference is not selected by a user.

For instance, the procedural texture modification system 106 can receive a selection of a representative color palette as the color property preference. In particular, the procedural texture modification system 106 can affect the extraction of colors from a digital image to prefer colors that are most representative of the digital image (e.g., most occurring, most neighbor colors identified for a color) in response to the selection of the representative color palette. Moreover, the procedural texture modification system 106 can affect the extraction of colors from the digital image to prefer colors that are determined to be more perceptible (e.g., colors that are more likely to be seen in a digital image) within the digital image. In some embodiments, the procedural texture modification system 106 adds a bias to a purity of excitation of the color because the human eye perceives pure colors over other colors in response to a selection of the representative color palette.

In one or more embodiments, the procedural texture modification system 106 can receive a selection of a pure color palette (e.g., a colorful color palette) as the color property preference. In particular, the procedural texture modification system 106 can affect the extraction of colors from a digital image to prefer colors with a higher saturation (e.g., a strong saturation) in response to the selection of the pure color palette.

Additionally, the procedural texture modification system 106 can receive a selection of a bright color palette as the color property preference. In particular, the procedural texture modification system 106 can affect the extraction of colors from a digital image to prefer colors with a higher brightness (e.g., a strong brightness) in response to the selection of the bright color palette. Furthermore, the procedural texture modification system 106 can affect the extraction of colors from a digital image to prefer colors with both a higher brightness and a higher saturation in response to the selection of the bright color palette. More specifically, the procedural texture modification system 106 can affect the extraction of colors from a digital image to prefer colors with a higher brightness that are further associated with a strong saturation in response to the selection of the bright color palette.

Moreover, the procedural texture modification system 106 can receive a selection of a pastel color palette as the color property preference. In particular, the procedural texture modification system 106 can affect the extraction of colors from a digital image to prefer colors with a lesser saturation (e.g., a weak saturation) in response to the selection of the pastel color palette. In addition, the procedural texture modification system 106 can affect the extraction of colors from a digital image to prefer colors with both a lower saturation and that are bright (e.g., having a strong brightness) in response to the selection of the pastel color palette. More specifically, the procedural texture modification system 106 can affect the extraction of colors from a digital image to prefer colors with a lesser saturation that are further associated with a higher brightness (e.g., a higher lightness) in response to the selection of the pastel color palette.

In some embodiments, the procedural texture modification system 106 receives a selection of a deep color palette as the color property preference. In particular, the procedural texture modification system 106 can affect the extraction of colors from a digital image to prefer colors that are darker (e.g., having a weak and/or lesser brightness) and also have a higher saturation (e.g., a strong saturation) in response to the selection of the deep color palette.

Furthermore, the procedural texture modification system 106 can receive a selection of a dark color palette as the color property preference. In particular, the procedural texture modification system 106 can affect the extraction of colors from a digital image to prefer colors that are darker (e.g., having a weak and/or a lesser brightness).

As shown in FIG. 3, the procedural texture modification system 106 can load an input image and can perform a conversion into a L*a*b space in the act 302. In particular, the procedural texture modification system 106 can transcribe pixels of the input image into a color space to create a representation of colors (e.g., colorimetric parameters) present in the input image. For instance, the procedural texture modification system 106 can utilize the color space CIELAB L*a*b CIE 1976 ("CIELAB color space") to create a representation of colors present in the input image.

Indeed, by transcribing the pixels of the input image into the CIELAB color space, the procedural texture modification system 106 can provide a representation of colors present in the input image in a space that enables the analysis of color differences perceptual by the human eye from the resulting color parameters of each pixel. For instance, the color space can include values representing changes in lightness and changes in one or more color channels for pixels of the input image. Moreover, by loading the input image conversion in the CIELAB color space, the procedural texture modification system 106 can perform linear operations on the colors (e.g., color parameters) of the input image (e.g., in accordance with the human perception of colors).

Furthermore, as shown in FIG. 3, the procedural texture modification system 106 can quantify pixels of the input image into color compartments in the act 304. In particular, the procedural texture modification system 106 can quantify pixels in the color space (e.g., the CIELAB color space) to distribute them into color compartments based on a three-dimensional grid (e.g., with the colorimetric parameters corresponding to the pixels in the L*a*b* space). Additionally, the procedural texture modification system 106 can determine one or more color compartments for the input image from the pixels in the three-dimensional grid and calculate a pixel average (e.g., a color average) for the color compartments.

As an example, the procedural texture modification system 106 can determine one or more color compartments for the input image based on the pixels (with colorimetric parameters) in the three-dimensional grid. For instance, the procedural texture modification system 106 can group one or more pixels from the three-dimensional grid into one or more color compartments. For example, the procedural texture modification system 106 can group one or more pixels that are near in distance (e.g., based on color similarity), near in space within the three-dimensional grid, and/or group the pixels by separating the pixels in the three-dimensional grid into a number of equal pixels (e.g., a specific number of pixels per color compartment).

Additionally, as an example, the procedural texture modification system 106 can adjust the size of color compartments (e.g., the number of pixels belonging to the color compartments) and/or the number of color compartments utilized based on the selected color property preference. As an example, the procedural texture modification system 106 can increase the number of color compartments utilized when the bright color palette is selected compared to other color palette options. Indeed, the procedural texture modification system 106 can adjust the size and/or number of color compartments in a number of ways based on the color property preference.

Furthermore, the procedural texture modification system 106 can calculate a pixel average for a color compartment. For example, the procedural texture modification system 106 can calculate an average color (e.g., an average colorimetric parameter) belonging to a color compartment based on the pixels associated with the color compartment (e.g., determine the color that is represented by the color compartment). Indeed, in some embodiments, the procedural texture modification system 106 calculates an average color for each of the color compartments of the input image.

Additionally, as shown in FIG. 3, the procedural texture modification system 106 can assign weights to the color compartments in the act 306. In particular, the procedural texture modification system 106 can initialize a weight for a color compartment according to the representativeness of the color compartment (e.g., amongst the color compartments of the input image). Moreover, procedural texture modification system 106 can normalize the weight of the color compartment. In addition, the procedural texture modification system 106 can also apply a factor, according to the selected color property preference, to the initialized weight to change how much affect the representativeness of the color compartment has on the initial weight for the color compartment. Indeed, the procedural texture modification system 106 can initialize weights for each color compartment of the input image.

As just mentioned, the procedural texture modification system 106 can initialize a weight for a color compartment according to the representativeness of the color compartment. As an example, the procedural texture modification system 106 can determine the number of pixels belonging to a color compartment to initialize the weight for the color compartment. In particular, the procedural texture modification system 106 can initialize the weight for the color compartment by dividing the number of pixels belonging to the color compartment by the total number of pixels of the input image. Indeed, the procedural texture modification system 106 can initialize a weight for each color compartment according to the representativeness of each color compartment in accordance with one or more embodiments herein.

Alternatively, as an example, the procedural texture modification system 106 can initialize a weight for a color compartment according to the representativeness of the color compartment by determining the number of other color compartments belonging to the input image that are similar to the color compartment being weighted. For instance, the procedural texture modification system 106 can determine a distance value based on a color similarity (e.g., between the average color of two color compartments) between each of the color compartments belonging to the input image and the color compartment being weighted. Indeed, the procedural texture modification system 106 can use a CIELAB Delta E 2000 calculation to determine the distance values between the color compartments. Furthermore, as an example, the procedural texture modification system 106 can count the number of color compartments that meet a threshold distance value to determine the number of other color compartments belonging to the input image that are similar to the color compartment being weighted. Moreover, the procedural texture modification system 106 can initialize the weight for the color compartment by dividing the number of similar color compartments to the total number of color compartments of the input image.

For instance, the procedural texture modification system 106 can represent an initial weight for a color compartment as $w_i$. Furthermore, the procedural texture modification system 106 can represent the number of pixels belonging to the color compartment as $n_i$ and the total number of pixels of the input image as N. Alternatively, the procedural texture modification system 106 can represent the number of similar color compartments to the color compartment being weighted as $n_i$ and the total number of color compartments of the input image as N. Moreover, the procedural texture modification system 106 can define an initial weight for a color compartment according to the representativeness of the color compartment in accordance with the following:

$$w_i = \frac{n_i}{N}$$

Furthermore, the procedural texture modification system 106 can normalize the initial weights of the color compartments after determining the initial weights. In particular, the procedural texture modification system 106 can normalize an initial weight of a color compartment according to the highest initial weight available from the color compartments of the input image. Furthermore, the procedural texture modification system 106 can also apply a factor (e.g., a constant value corresponding to a color property preference) to the normalized initial weights. Indeed, the procedural texture modification system 106 can utilize the factor to change the affect that representativeness of the color compartments has on the initial weights. In particular, the procedural texture modification system 106 can utilize more or less affect from the representativeness of the color compartments on the initial weight based on the selected color property preference (e.g., the selected color palette type). Indeed, the procedural texture modification system can normalize an initial weight for each color component in accordance with one or more embodiments herein.

For example, the procedural texture modification system 106 can represent the maximum initial weight (e.g., highest initial weight) available from the color compartments as $w_{max}$ and the factor based on the color property preference as r (e.g., a constant value that influences the effect of representativeness of a color compartment on the initial weight). Indeed, the procedural texture modification system 106 can utilize a larger r value for the representative color palette compared to the bright color palette selection.

Indeed, the procedural texture modification system 106 can configure the value of r in a variety of ways based on the selected color palette type. Moreover, the procedural texture modification system 106 can define a normalized and factored initial weight for a color compartment (as the assigned weight for the color compartment) according to the representativeness of the color compartment in accordance with the following:

$$w_i = \left(\frac{w_i}{w_{max}}\right)^r$$

Furthermore, as illustrated in FIG. 3, the procedural texture modification system 106 can alter weights according to a color property preference in the act 308. In particular, the procedural texture modification system 106 can alter initial weights of color compartments (e.g., initial weights assigned as described above) based on a selected color property preference (e.g., a selected color palette type). Indeed, the procedural texture modification system 106 can alter the initial weights corresponding to the color compartments by applying a color property preference value (e.g., a color property factor) to the initial weights.

For example, the procedural texture modification system 106 can represent a color property preference value as $w_c$. Moreover, the value of $w_c$ can correspond to a value based on a formula (or algorithm) corresponding to a color palette type (as described in greater detail below). Furthermore, the procedural texture modification system 106 can tie $w_c$ to (epsilon, 1) so that $w_c$ does not nullify a weight associated with a color compartment. Indeed, in one or more embodiments, the procedural texture modification system 106 alters an assigned initial weight for a color compartment to determine a weight for the color compartment (e.g., w) in accordance with the following:

$$w = w_i \times w_c^2$$

Furthermore, the procedural texture modification system 106 can determine a color property preference value (e.g., $w_c$) to alter weights of color compartments. For instance, the procedural texture modification system 106 can determine a color property preference value (e.g., $w_c$) for individual color palette types. Indeed, the procedural texture modification system 106 can utilize one or more colorimetric parameters corresponding to the color compartments (e.g., the averaged color settings based on the CIELAB color space values) to determine the color property preference value.

For example, the procedural texture modification system 106 can determine an excitation purity value (e.g., Pe) for a color compartment (or an average color belonging to the color compartment). In particular, the excitation purity value can represent how, in the chromatic diagram of the CIELAB color space, a color moves away from the achromatic center of the diagram to approximate the colors dominant wavelength (e.g., λ). In other words, the excitation purity value can represent the dominant wavelength (e.g., λ) of an average color belonging to the color compartment within a chromaticity diagram associated with the CIELAB color space. For example, the procedural texture modification system 106 can define the excitation purity value of a color in the CIELAB color space (e.g., where a and b can represent the difference between a chromaticity of a white point for the hue of the color and the color point and $a_\lambda + b_\lambda$ can represent the difference between the chromaticity of the white point for the hue of the color and a point on the perimeter of the chromaticity diagram whose line segment to the white point contains the chromaticity point of the color), in accordance with the following:

$$Pe = \frac{(a+b)}{(a_\lambda + b_\lambda)}$$

In one or more embodiments, the procedural texture modification system 106 determines a color property preference value (e.g., $w_c$) to alter weights of color compartments for the representative color palette type. In particular, the procedural texture modification system 106 can provide a slight bias to pure colors (e.g., because the human eye tends to perceive pure colors). For instance, the procedural texture modification system 106 can determine the color property preference value for the representative color palette type (e.g., R) for a color from a color compartment by utilizing an excitation purity value corresponding to the color from the color compartment. Indeed, the procedural texture modification system 106 can utilize the color property preference value for the representative color palette type (e.g., R) corresponding to the color compartment as $w_c$ to alter weights of the color compartment (as described above). For example, the procedural texture modification system 106 can define the color property preference value for the representative color palette type (e.g., R) for a color from a color compartment (e.g., using the colors excitation purity value, Pe) in accordance with the following:

$$R = \sqrt{0.2 + 0.8 Pe}$$

Furthermore, the procedural texture modification system 106 can determine a color property preference value (e.g., $w_c$) to alter weights of color compartments for the pure color palette type. For instance, the procedural texture modification system 106 can determine the color property preference value for the pure color palette type (e.g., P) for a color from a color compartment by using an excitation purity value corresponding to the color from the color compartment as the color property preference value for the pure color palette type. Indeed, the procedural texture modification system 106 can utilize the color property preference value for the pure color palette type (e.g., P) corresponding to the color compartment as $w_c$ to alter weights of the color compartment (as described above). For example, the procedural texture modification system 106 can define the color property preference value for the pure color palette type (e.g., P) for a color from a color compartment (e.g., using the colors excitation purity value, Pe) in accordance with the following:

$$P = Pe$$

Additionally, the procedural texture modification system 106 can also determine a color property preference value (e.g., $w_c$) to alter weights of color compartments for the bright color palette type. For instance, the procedural texture modification system 106 can determine the color property preference value for the bright color palette type (e.g., B) for a color from a color compartment by adding a bias on the brightness (e.g., L) in addition to the excitation purity (e.g., Pe) of the color from the color compartment in comparison to the dominant wave length (e.g., $L_\lambda$) of the color. Indeed, the procedural texture modification system 106 can utilize the color property preference value for the bright color palette type (e.g., B) corresponding to the color compartment as $w_c$ to alter weights of the color compartment (as described above). For example, the procedural texture modification system 106 can define the color property preference value for the bright color palette type (e.g., B) for a color from a color compartment in accordance with the following:

$$B = L \times Pe \times (1 - \sqrt{L-L_\lambda})$$

Moreover, the procedural texture modification system 106 can also determine a color property preference value (e.g., $w_c$) to alter weights of color compartments for the pastel color palette type. For instance, the procedural texture modification system 106 can determine the color property preference value for the pastel color palette type (e.g., Pa) for a color from a color compartment by adding a bias on the brightness (e.g., l) and desaturation (e.g., s) of the color from the color compartment in the HSV space (e.g., hue, saturation, value space). Indeed, the procedural texture modification system 106 can utilize the color property preference value for the pastel color palette type (e.g., Pa) corresponding to the color compartment as $w_c$ to alter weights of the color compartment (as described above). For example, the procedural texture modification system 106 can define the color property preference value for the pastel color palette type (e.g., Pa) for a color from a color compartment in the HSV space (e.g., V represents an intensity of the color in the HSV space and S represents an amount of saturation for the color in the HSV space) in accordance with the following:

$$l = 2.2\ V - 1.2$$
$$s = \sin\left(\frac{3\pi}{4}(1 - 0.95S)\right)$$
$$Pa = ls^2$$

Additionally, the procedural texture modification system 106 can also determine a color property preference value (e.g., $w_c$) to alter weights of color compartments for the deep color palette type. For instance, the procedural texture modification system 106 can determine the color property preference value for the deep color palette type (e.g., De) for a color from a color compartment by utilizing the brightness (e.g., L) and excitation of purity value (e.g., Pe) of the color from the color compartment to promote saturated and dark colors. Indeed, the procedural texture modification system 106 can utilize the color property preference value for the deep color palette type (e.g., De) corresponding to the color compartment as $w_c$ to alter weights of the color compartment (as described above). For example, the procedural texture modification system 106 can define the color property preference value for the deep color palette type (e.g., De) for a color from a color in accordance with the following:

$$De = \sqrt{Pe}(1-L)^2$$

Furthermore, the procedural texture modification system 106 can also determine a color property preference value (e.g., $w_c$) to alter weights of color compartments for the dark color palette type. For instance, the procedural texture modification system 106 can determine the color property preference value for the dark color palette type (e.g., Da) for a color from a color compartment by utilizing the brightness (e.g., L) of the color from the color compartment to promote dark colors. Indeed, the procedural texture modification system 106 can utilize the color property preference value for the dark color palette type (e.g., Da) corresponding to the color compartment as $w_c$ to alter weights of the color compartment (as described above). For example, the procedural texture modification system 106 can define the color property preference value for the dark color palette type (e.g., Da) for a color from a color in accordance with the following:

$$Da = |1 - 1.2L|^2$$

In addition, as shown in FIG. 3, the procedural texture modification system 106 can select a color based on a max weight in the act 310. In particular, the procedural texture modification system 106 can identify a max weight from the weights corresponding to the color compartments of the input image by identifying a weight having the highest numerical value in comparison to other weights corresponding to the color compartments. Indeed, the procedural texture modification system 106 can select the average color value from a color compartment corresponding to the max weight (e.g., the highest weight amongst the weights of the color compartments) for a color palette.

Furthermore, as shown in FIG. 3, the procedural texture modification system 106 can determine whether the procedural texture modification system 106 has selected N colors (e.g., a number of colors specified by a user and/or set by the procedural texture modification system 106) in the act 310 after selecting a color corresponding to a color compartment having a max weight. For example, as shown in FIG. 3, if the procedural texture modification system 106 has not selected N colors for a color palette, the procedural texture modification system 106 can alter weights (of the color compartments) according to a distance between the previously selected color and the color compartments in the act 314. Indeed, the procedural texture modification system 106 alters the weights in the act 314 to exclude neighboring colors of a previously selected color (e.g., to avoid selecting and/or repetition of similar colors for a color palette).

For example, the procedural texture modification system 106 can determine distances between the selected color and the average colors corresponding to the color compartments of the input image utilizing a CIELAB Delta E 2000 function. In particular, the CIELAB Delta E 2000 function determines a quantified value for similarities (and/or differences) between colors (e.g., colorimetric parameters). For example, the procedural texture modification system 106 can determine a distance ($D_i$) between a color compartment and a selected color in a color space (e.g., for a color compartment of the input image for each color compartment i).

Additionally, the procedural texture modification system 106 can produce a fall off around the selected color such that only the weights of color compartments that exist within a certain radius around the selected color (e.g., in terms of distance) are affected (e.g., in proportion to the distance between each color compartment and the selected color). Moreover, the procedural texture modification system 106 can prevent altering the weights of color compartments with distance values that are outside of the radius around the selected color (e.g., color compartments that are determined to be outside of the fall off around the selected color).

Furthermore, the procedural texture modification system 106 can also utilize the selected color property preference to adjust the influence of the distance between the average colors of the color compartments and the selected color when altering the weights. For instance, the procedural texture modification system 106 can utilize a constant value (e.g., f) with the CIELAB Delta E 2000 function to adjust the influence of the distance between the average colors of the color compartments and the selected color. Indeed, the procedural texture modification system 106 can set the constant value f based on the selected color property preference.

For example, the procedural texture modification system 106 can define the distance between an average color of a color compartment and a selected color (e.g., a quantified measure of how much to influence the weight of a color compartment based on a fall off radius around the selected color, a constant value f, and also proportional to the distance, $D_i$, between the color compartment and the selected color) in accordance with the following:

$$wd_i = \frac{\cos\left(\min\left(\pi, \frac{\pi D_i}{f}\right)\right) + 1}{2}$$

Moreover, the procedural texture modification system 106 can alter the weights (e.g., $w_i$) of color compartments based on the determined distance between the average color of the color compartments and the selected color (e.g., $wd_i$). For instance, the procedural texture modification system 106 can alter the weight (e.g., to generate an additional weight) of a color compartment (e.g., $w_i$) using the distance between the average color of the color compartments and the selected color (e.g., $wd_i$) in accordance with the following:

$$w_i = w_i \times (1 - wd_i)$$

Indeed, as an example, the procedural texture modification system 106 can nullify the weight of the color compartment of the selected color because the distance ($D_i$) between the color compartment of the selected color and itself is 0 (e.g., $wd_i$ will equal 1 and therefore $w_i$ will equal 0). Furthermore, as an example, the procedural texture modification system 106 will influence the weight ($w_i$) of color compartments that are within a certain radius of the selected color (e.g., in terms of distance) by reducing the weight $w_i$ of the color compartment (e.g., $wd_i$ will be in between 0 and 1 and therefore $w_i$ will multiplied by a value between 0 and 1). Moreover, as an example, the procedural texture modification system 106 will not alter the weight ($w_i$) of color compartments that are outside a certain radius of the selected color (e.g., $wd_i$ will equal 1 and therefore $w_i$ will multiplied by a value of 1).

In addition (or in the alternative), in some embodiments, the procedural texture modification system 106 excludes one or more color compartments based on the determined distance between the average color of the color compartments and the selected color. For instance, the procedural texture modification system 106 can utilize a fall off distance value threshold to exclude one or more color compartments. In particular, the procedural texture modification system 106 can remove one or more color compartments (e.g., for use in selecting colors for a subsequent color for the color palette) that have a distance value between the average color of the color compartments and the selected color that meets the fall off distance value threshold (e.g., the distance value is low enough to demonstrate that the color compartments have colors that are too similar to the selected color).

Moreover, as shown in FIG. 3, the procedural texture modification system 106 can utilize the altered weights (corresponding to the color compartments) according to the distances between the previously selected color and the color compartments of act 314 to select a subsequent color for the color palette. In particular, the procedural texture modification system 106 can identify a max weight from the re-altered weights based on the distance values (of act 314) corresponding to the color compartments. Indeed, the procedural texture modification system 106 can select the average color value from a color compartment corresponding to the max weight (e.g., the highest weight amongst the additional weights of the color compartments) for the color palette. Moreover, the procedural texture modification system 106 can iteratively select colors based on max weights of color compartments, alter the weights of the color compartments based on distances between the prior selected color and average colors of the color compartments, and select a subsequent color based on the re-altered weights (in accordance with one or more embodiments herein) until the procedural texture modification system 106 selects N colors.

Furthermore, as shown in FIG. 3, upon selecting N colors (in the act 310), the procedural texture modification system 106 can utilize the selected N colors to generate a color palette in the act 312. Indeed, in one or more embodiments, the procedural texture modification system 106 utilizes the selected N colors as the colors belonging to the color palette. Additionally, the procedural texture modification system 106 can generate the color palette by scheduling the selected N colors (e.g., ordering the colors in an ordered list of colors).

For instance, the procedural texture modification system 106 can perform color scheduling to generate the color palette (in the act 312) based on the representativeness of the selected N colors. In particular, the procedural texture modification system 106 can determine which pixels of the input image are represented by each of the selected N colors. For example, the procedural texture modification system 106 can utilize the CIELAB Delta E 2000 function to determine distance values between colors from the selected N colors and the colorimetric parameters corresponding to each pixel of the input image. Moreover, the procedural texture modification system 106 can associate the pixels having a similar color value (e.g., neighboring pixels based on color attributes) with the selected color.

Furthermore, the procedural texture modification system 106 can determine and associate pixels having similar color values with each of the selected N colors. For example, the procedural texture modification system 106 can identify, using the distance values between the colors and the pixels, the closest color from the selected N colors to a pixel and associate the pixel to the identified closest color. Additionally, the procedural texture modification system 106 can determine the number of pixels associated with each of the selected N colors. Moreover, the procedural texture modification system 106 can perform color scheduling to generate the color palette (in the act 312) based on the representativeness of the selected N colors by ordering the selected N colors based on how many pixels are associated with each of the selected N colors. As an example, the procedural texture modification system 106 can order the selected N colors from the color having the most pixels to the color having the least pixels and utilize the ordered list of the selected N colors as the color palette (in the act 312).

In addition (or in the alternative), in one or more embodiments, the procedural texture modification system 106 utilizes a threshold distance value to determine which pixels to associate with the selected color. For example, the procedural texture modification system 106 can associate a pixel with the selected color when the determined distance between the colorimetric parameters of a pixel and the selected color meet the threshold distance value (e.g., pixels having colorimetric parameters that are closer to the selected color). Furthermore, in some embodiments, the procedural texture modification system 106 associates pixels to more than one selected N colors based on the threshold distance values. Indeed, the procedural texture modification system 106 can determine the number of pixels associated with each of the selected N colors based on the threshold distance values to perform color scheduling based on color representativeness to generate the color palette.

Furthermore, the procedural texture modification system 106 can perform color scheduling to generate the color palette (in the act 312) based on a color space characteristic (e.g., the HSV color space). In particular, the procedural texture modification system 106 can determine and/or identify color space characteristics corresponding to the selected N colors and perform color scheduling by ordering the selected N colors based on the identified color space characteristics. For example, the procedural texture modification system 106 can identify hue values and/or hue characteristics (e.g., a value between 0 degrees and 360 degrees) of the selected N colors as the color space characteristics. Moreover, as an example, the procedural texture modification system 106 can order the selected N colors based on the hue values (e.g., greatest to least and/or least to greatest values) and utilize the ordered list of the selected N colors as the color palette in the act 312 (e.g., ordered based on hue of the colors).

Additionally, the procedural texture modification system 106 can also utilize other color space characteristics to perform color scheduling to generate the color palette (in the act 312). For example, the procedural texture modification system 106 can identify intensity values (e.g., brightness characteristics) and/or saturation values of the selected N colors as the color space characteristics. As an example, the procedural texture modification system 106 can order the selected N colors based on the brightness values and/or brightness characteristics (e.g., greatest to least and/or least to greatest) and utilize the ordered list of the selected N colors as the color palette in the act 312 (e.g., ordered based on brightness of the colors). In some embodiments, the procedural texture modification system 106 utilizes brightness characteristics to schedule the selected N colors when the hue values of the selected N colors are near in value.

In some embodiments, the procedural texture modification system 106 can perform color scheduling to generate the color palette (in the act 312) based on an order of discovery. In particular, the procedural texture modification system 106 can utilize the order in which the selected N colors were extracted from the input image in accordance with one or more embodiments herein as the order in which the selected N are used in the generated color palette (in the act 312).

Indeed, upon scheduling the selected N colors in accordance with one or more embodiments herein, the procedural texture modification system 106 can generate the color palette in act 312. Furthermore, the procedural texture modification system 106 can display the color palette in a user interface. Additionally, the procedural texture modification system 106 can display the color palette such that the colors of the color palette are displayed within the user interface (e.g., a colorized visual representation of the color palette). Moreover, the procedural texture modification system 106 can provide and/or display the CIELAB, RGB values, and/or hexadecimal color values of the colors from the color palette in the user interface.

Figure 4:
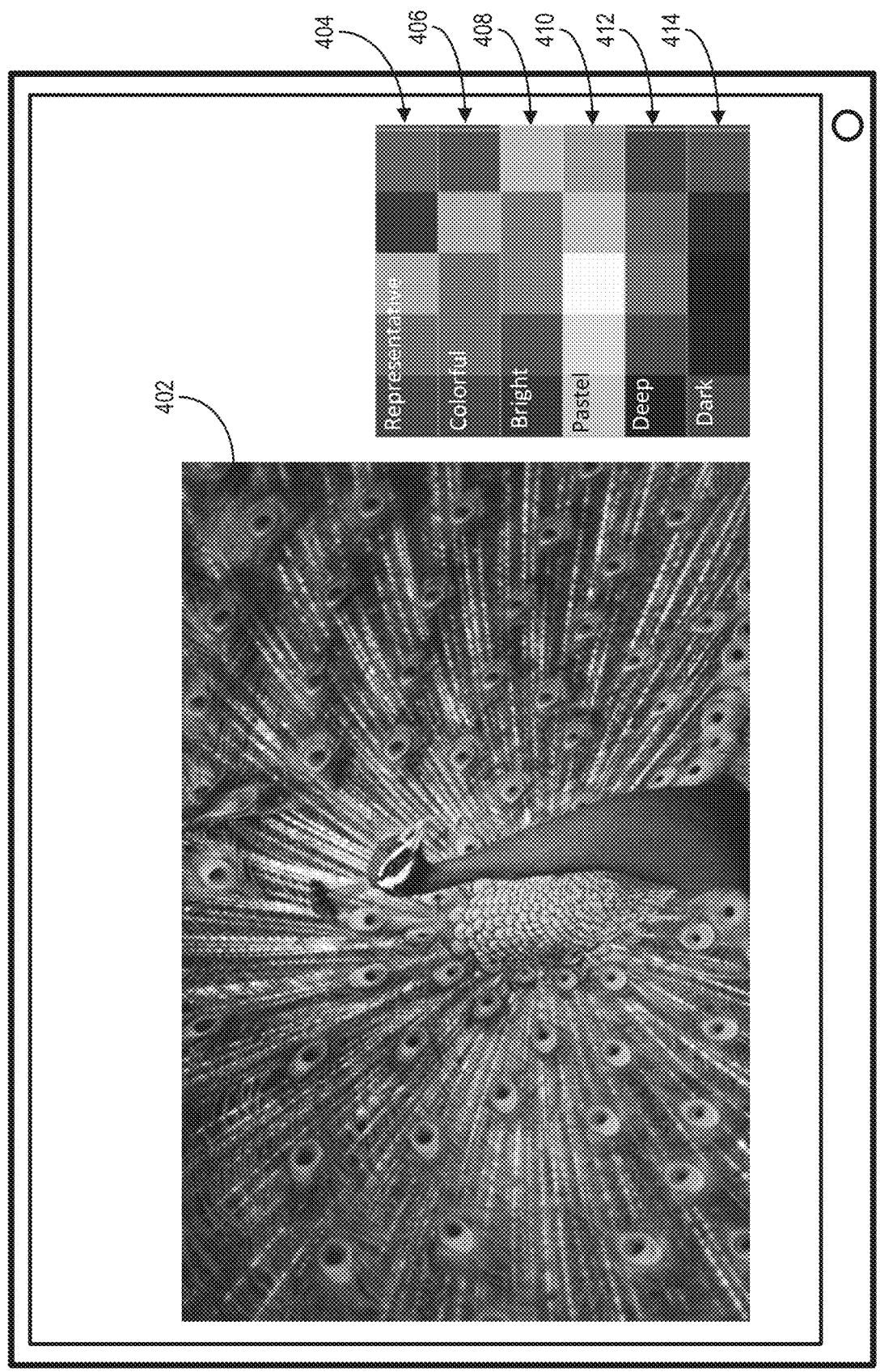

FIG. 4 illustrates an example of a plurality of color palettes 404-414 generated from an image 402 according to six varying color property preferences (e.g., color palette types). For example, as shown in FIG. 4, the procedural texture modification system 106 can generate and display a representative color palette 404 for the image 402 (e.g., based on a representative color palette type selection). Furthermore, as illustrated in FIG. 4, the procedural texture modification system 106 can generate and display a colorful color palette 406 for the image 402 (e.g., based on a pure color palette type selection). Moreover, as shown in FIG. 4, the procedural texture modification system 106 can generate and display a bright color palette 408 for the image 402 (e.g., based on a bright color palette type selection). Furthermore, as shown in FIG. 4, the procedural texture modification system 106 can generate and display a pastel color palette 410 for the image 402 (e.g., based on a pastel color palette type selection). Additionally, as illustrated in FIG. 4, the procedural texture modification system 106 can generate and display a deep color palette 412 for the image 402 (e.g., based on a deep color palette type selection). Moreover, as shown in FIG. 4, the procedural texture modification system 106 can generate and display a dark color palette 414 for the image 402 (e.g., based on a dark color palette type selection).

Furthermore, as mentioned above, the procedural texture modification system 106 can generate color palettes using different sets of colors that are visually perceptible (e.g., colors that are highly representative of what the human eye can generally observe and appreciate) in an image according to a color property preference. Indeed, as illustrated in FIGS. 5A-5F, the procedural texture modification system 106 can generate color palettes having different colors from in image based on a color palette type. Although FIGS. 5A-5F are presented in grey scale, FIGS. 5A-5F illustrate pointers to locations of a color in an image and the RGB values of those colors to demonstrate the colors of the color palettes.

Figure 5A:
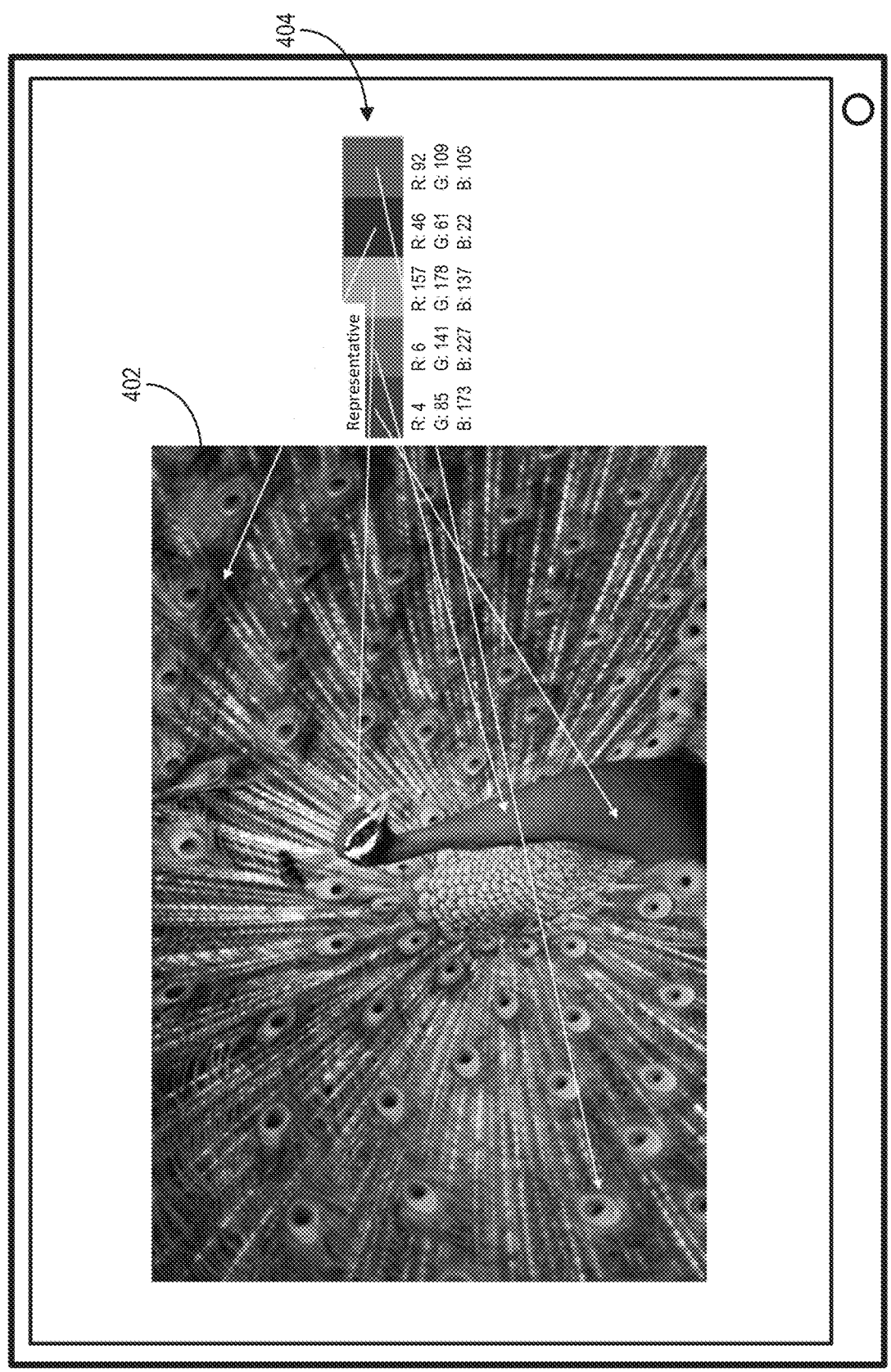

For instance, as illustrated in FIG. 5A, the procedural texture modification system 106 can generate and display a representative color palette 404 for the image 402 (e.g., based on a representative color palette type selection) that extracts one or more colors based on their representativeness of the image 402 in accordance with one or more embodiments herein.

Figure 5B:
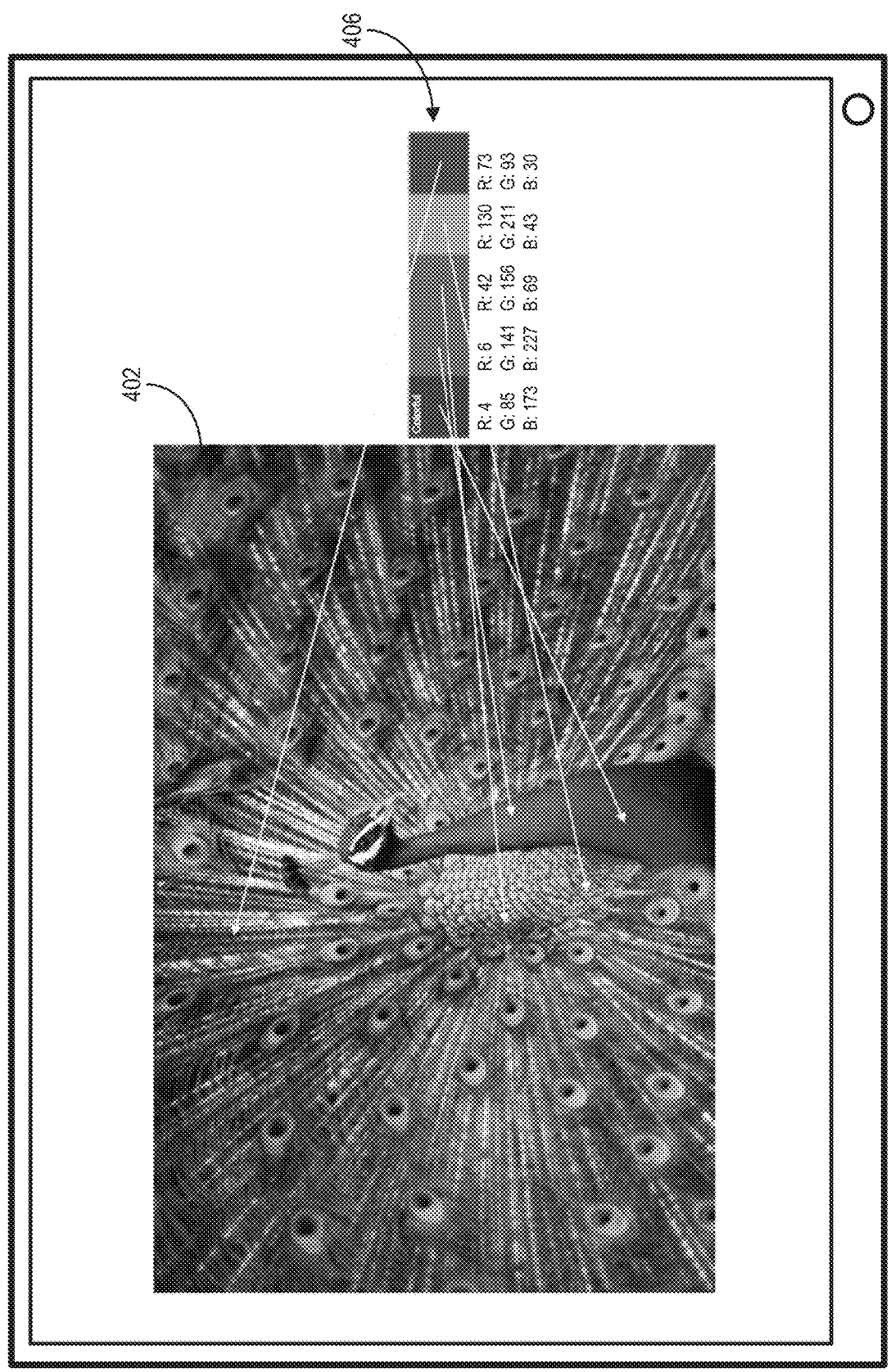

Furthermore, as shown in FIG. 5B, the procedural texture modification system 106 can generate and display a colorful color palette 406 for the image 402 (e.g., based on a pure color palette type selection) that extracts one or more colors based on their excitation of purity value in accordance with one or more embodiments herein.

Figure 5C:
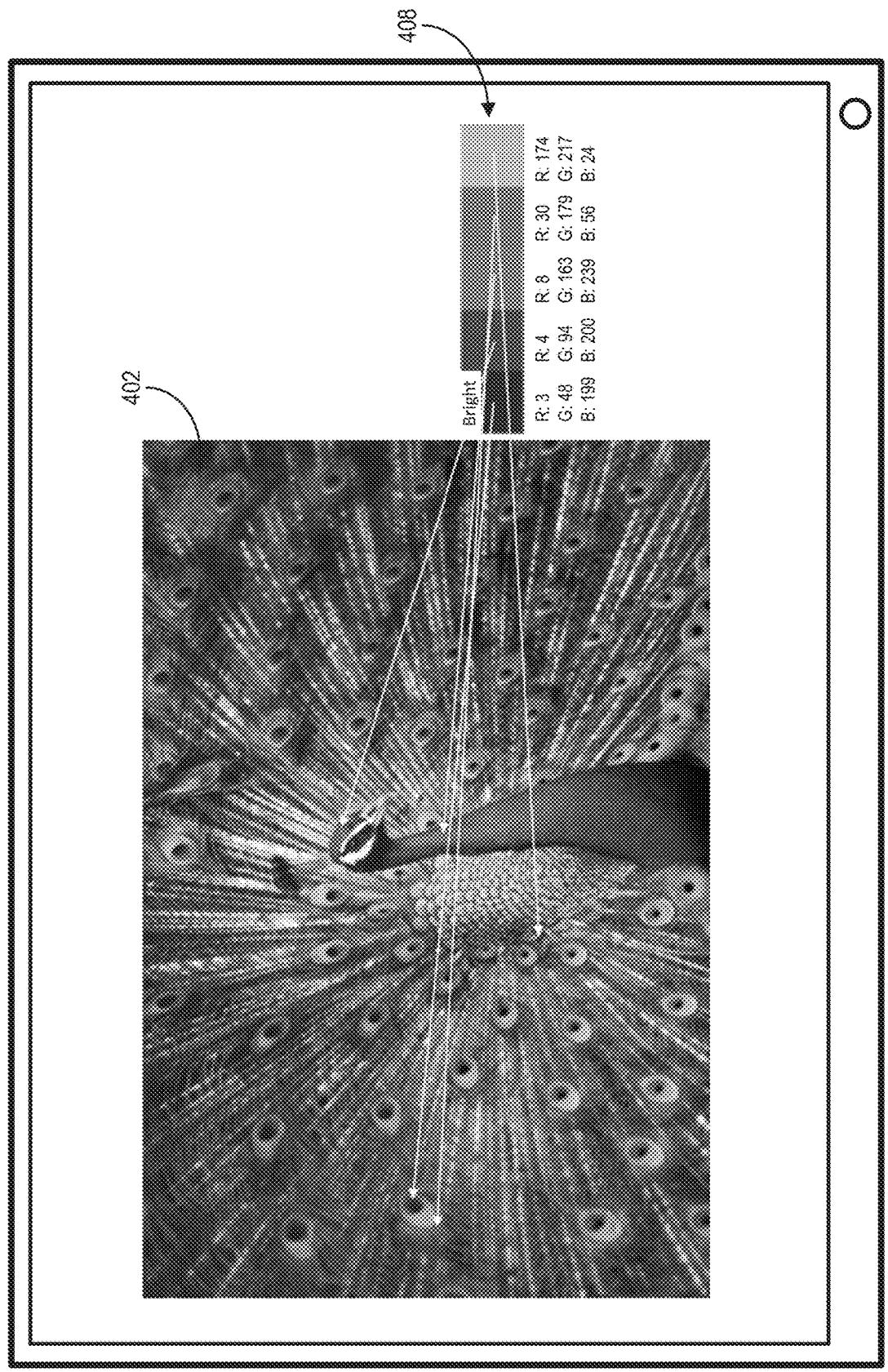

Additionally, as illustrated in FIG. 5C, the procedural texture modification system 106 can generate and display a bright color palette 408 for the image 402 (e.g., based on a bright color palette type selection) that extracts one or more colors based on their brightness in accordance with one or more embodiments herein.

Moreover, as shown in FIG. 5D, the procedural texture modification system 106 can generate and display a pastel color palette 410 for the image 402 (e.g., based on a pastel color palette type selection) that extracts one or more colors based on their saturation and brightness in accordance with one or more embodiments herein.

Figure 5E:
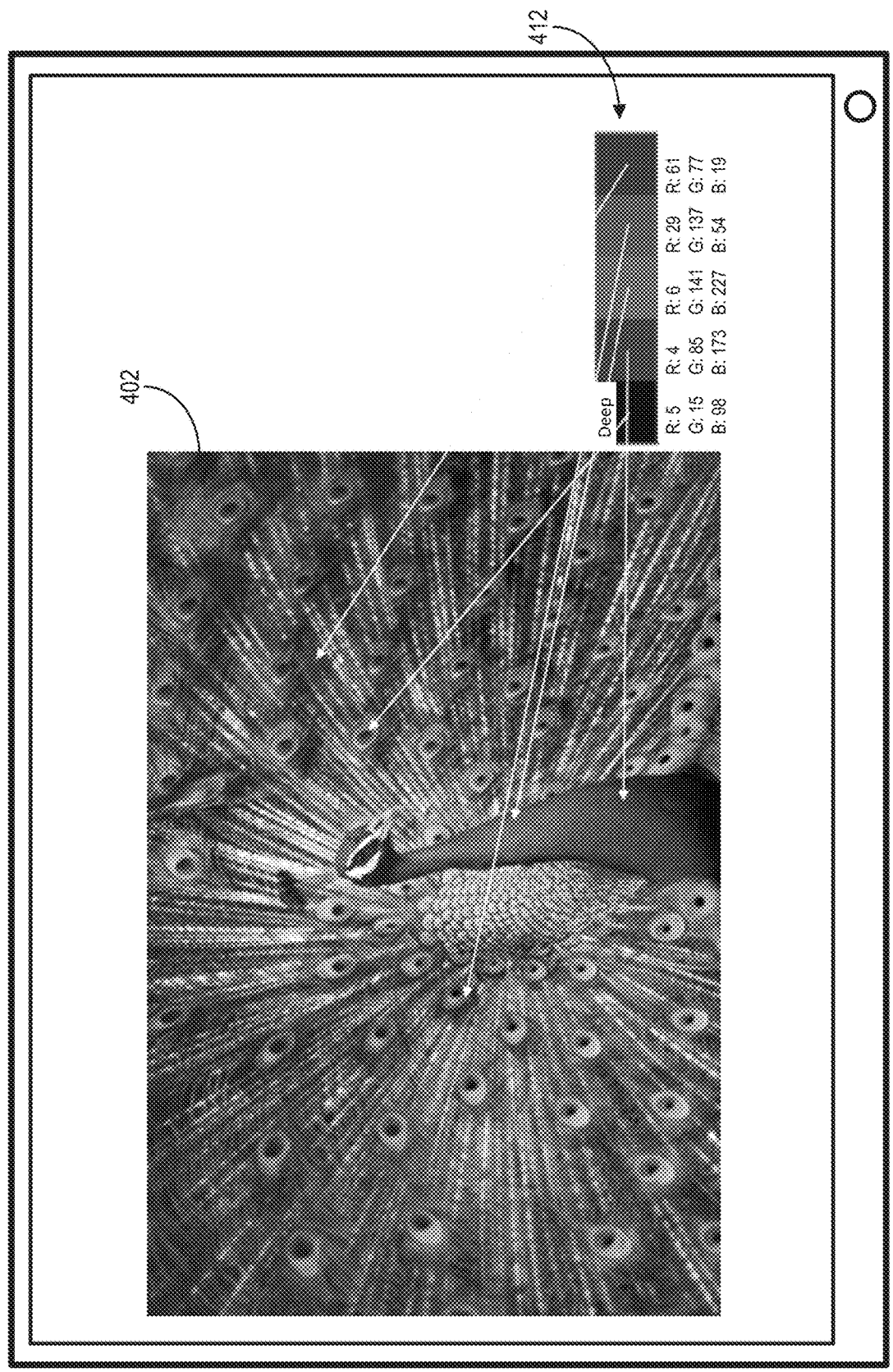

Furthermore, as illustrated in FIG. 5E, the procedural texture modification system 106 can generate and display a deep color palette 412 for the image 402 (e.g., based on a deep color palette type selection) that extracts one or more colors based on their saturation and brightness (e.g., lack of brightness) in accordance with one or more embodiments herein.

Figure 5F:
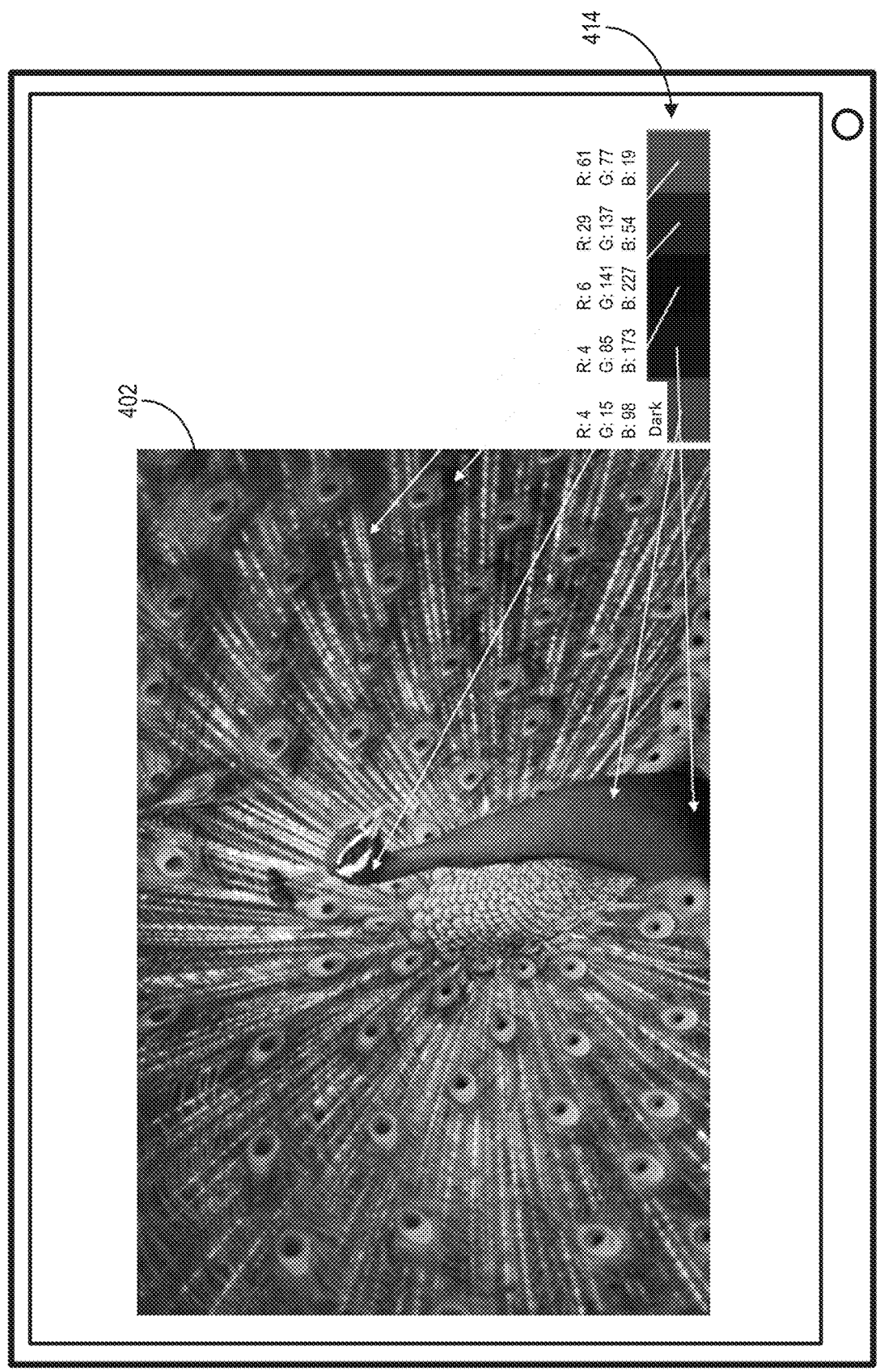

Additionally, as shown in FIG. 5F, the procedural texture modification system 106 can generate and display a dark color palette 414 for the image 402 (e.g., based on a dark color palette type selection) that extracts one or more colors based on their brightness (e.g., lack of brightness) in accordance with one or more embodiments herein.

Figure 6:
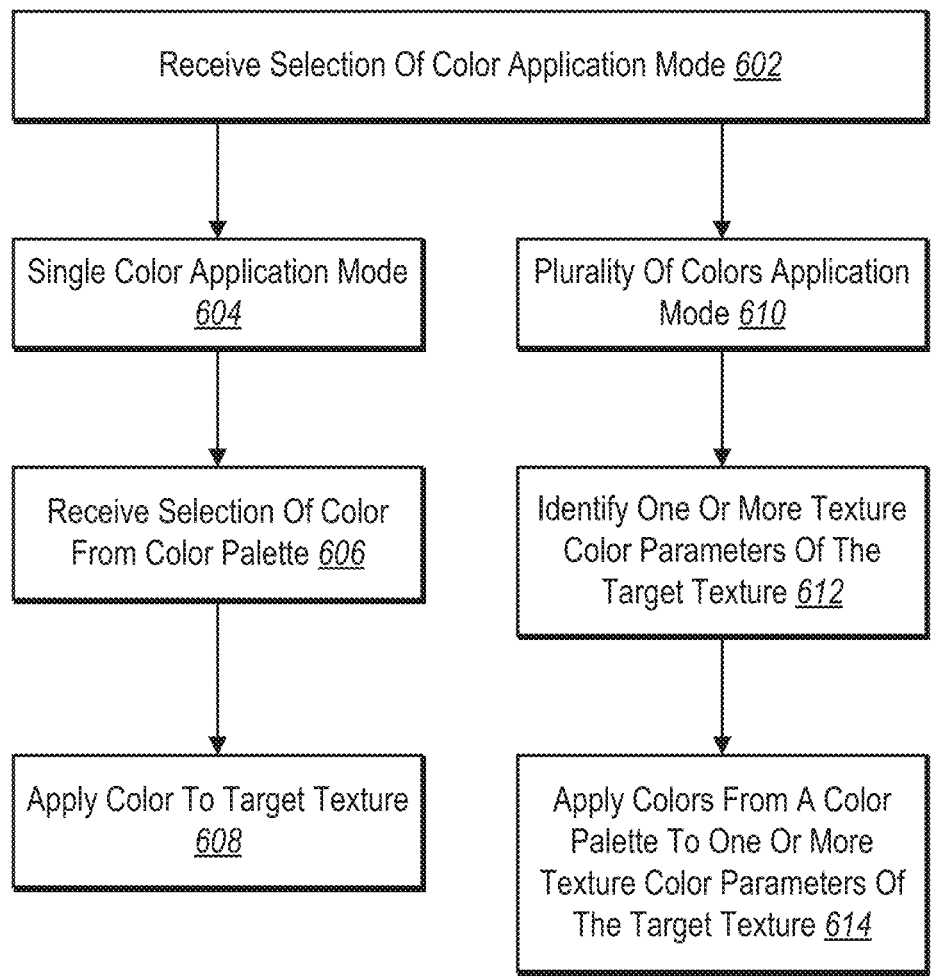
FIG. 6 illustrates a diagram of applying colors from a color palette to a target procedural texture in accordance with one or more embodiments.

As mentioned above, the procedural texture modification system 106 can apply one or more colors of a color palette to a target procedural texture. For example, FIG. 6 illustrates a flow chart of the procedural texture modification system 106 applying one or more colors of a color palette to a target procedural texture. In particular, FIG. 6 illustrates the procedural texture modification system 106 receiving a selection of a color application mode (in an act 602). Indeed, as shown in FIG. 6, the procedural texture modification system 106 can receive a selection of two color application modes (e.g., a single color application mode in an act 604 and a plurality of colors application mode in act 610). Indeed, the procedural texture modification system 106 can enable a user to select any of the application modes at any time and utilize a color palette (e.g., a color palette generated in accordance with one or more embodiments herein) to modify a texture according to the application mode. Furthermore, the procedural texture modification system 106 can default to and/or determine a color application mode without a user selection.

For instance, in response to the selection of a single color application mode (in an act 604), FIG. 6 illustrates the procedural texture modification system 106 receiving a selection of a color from a color palette (in an act 606) and applying the color to a target procedural texture (in an act 608). For instance, the procedural texture modification system 106 can display a color palette in a user interface and enable a user to select a color from the color palette. Furthermore, although FIG. 6 illustrates the procedural texture modification system 106 receiving a selection of a color from a color palette in the act 606, the procedural texture modification system 106 can apply each color of the color palette to a target procedural texture to generate multiple variations of the target procedural texture (e.g., each variation corresponding to a color of the color palette).

Additionally, as shown in FIG. 6, the procedural texture modification system 106 can apply a color to the target procedural texture in the act 608 (e.g., in a single color application mode). For instance, the procedural texture modification system 106 can apply a color from the color palette (e.g., a color palette generated from an input image in accordance with one or more embodiments herein) to change a color for an entire surface of the target procedural texture to modify the target procedural texture. In particular, the procedural texture modification system 106 can apply a color from the color palette (e.g., a colorimetric parameter associated with the color from the color palette) to modify the colorimetric parameters of the target procedural texture to resemble the color from the color palette.

Furthermore, the procedural texture modification system 106 can apply the color from the color palette to the entire surface of the target procedural texture while preserving other characteristics of the target procedural texture. For instance, the procedural texture modification system 106 can apply the color from the color palette to the target procedural texture without changing other characteristics of the target procedural texture such as, but not limited to, material properties (e.g., attributes associated with the type of material such as metallic, plastic, fabric, etc.), finish properties, structure properties, and/or highlight properties of the target procedural texture.

Moreover, in response to the selection of a plurality of colors application mode (in an act 610), as illustrated in FIG. 6, the procedural texture modification system 106 can identify one or more texture color parameters of the target procedural texture (in an act 612) and applying colors from a color palette to one or more texture color parameters of the target procedural texture (in an act 614). In particular, the procedural texture modification system 106 can apply one or more colors of a color palette to one or more distinctive colors of a target procedural texture. Indeed, the procedural texture modification system 106 can identify colors (e.g., distinctive colors) of the target procedural texture based on one or more texture color parameters of the target procedural texture (e.g., colorimetric parameters of the target procedural texture). Furthermore, the procedural texture modification system 106 can identify any number of colors from the target procedural texture. In some embodiments, the procedural texture modification system 106 identifies a number of colors (e.g., texture color parameters) from the target procedural texture that is equivalent to the number of colors available in a color palette being applied to the target procedural texture.

As shown in FIG. 6, the procedural texture modification system 106 can identify one or more texture color parameters of a target procedural texture in the act 612. For example, the procedural texture modification system 106 can identify one or more texture color parameters by generating a color palette for the texture in accordance with one or more embodiments above. In particular, as an example, the procedural texture modification system 106 can load a target procedural texture conversion in a CIELAB color space, quantify the pixels of the target procedural texture into color compartments, assign weights to the color compartments, alter weights according to a color property preference, and/or select colors for the target procedural texture based on weights of the color compartments. Furthermore, as an example, the procedural texture modification system 106 can additionally select subsequent colors for the target procedural texture based on distances between previously selected colors and the color compartments.

Moreover, the procedural texture modification system 106 can identify one or more texture color parameters based on user (and/or system) defined settings for a target procedural texture. In particular, procedural texture modification system 106 can identify settings included with the target procedural texture (e.g., settings created during the creation of the texture) that define a set of texture color parameters to utilize during a modification step. For instance, the procedural texture modification system 106 can identify settings included with the target procedural texture that define a set of distinctive texture color parameters and/or zones (or pixels) in the target procedural texture that correspond to those distinctive texture color parameters.

Additionally, as shown in FIG. 6, upon identifying one or more texture color parameters of a target procedural texture, the procedural texture modification system 106 can apply colors from a color palette to one or more texture color parameters of the target procedural texture (in the act 614). In particular, the procedural texture modification system 106 can pair (and/or map) one or more colors from a color palette to one or more texture color parameters. Furthermore, the procedural texture modification system 106 can apply the colors from the color palette to the texture color parameters according to the pairing.

For example, the procedural texture modification system 106 can pair one or more colors from a color palette to one or more texture color parameters based on representativeness. For instance, the procedural texture modification system 106 can perform color scheduling on the one or more texture color parameters to generate an ordered list of texture color parameters based on representativeness of the texture color parameters (e.g., as described above in relation to scheduling colors for a color palette). Indeed, the procedural texture modification system 106 can determine which pixels (and/or zones) of a texture are represented by each of the distinctive texture color parameters identified from a texture based on distances between the pixels (and/or zones) and the distinctive texture color parameters. Furthermore, the procedural texture modification system 106 can generate the ordered list by ordering the texture color parameters based on the representativeness of the texture color parameters by ordering the texture color parameters based on how many pixels (and/or zones) are associated with each of the texture color parameters. Then, the procedural texture modification system 106 can pair the ordered list of the texture color parameters to colors from a color palette (e.g., a color palette scheduled based on representativeness).

Furthermore, as an example, the procedural texture modification system 106 can pair one or more colors from a color palette to one or more texture color parameters based on color space characteristics. For instance, the procedural texture modification system 106 can perform color scheduling on the one or more texture color parameters to generate an ordered list of texture color parameters based on color space characteristics corresponding to the texture color parameters (e.g., as described above in relation to scheduling colors for a color palette). In particular, the procedural texture modification system 106 can determine and/or identify color space characteristics corresponding to the identified texture color parameters (e.g., hue values, brightness values, saturation values, etc.). Furthermore, the procedural texture modification system 106 can generate the ordered list by ordering the texture color parameters based on the identified color space characteristics.

As an example, the procedural texture modification system 106 can identify hue values and/or hue characteristics (e.g., a value between 0 degrees and 360 degrees) of the texture color parameters and order the texture color parameters according to those hue characteristics (e.g., greatest to least and/or least to greatest values) to generate the ordered list of texture color parameters. Moreover, the procedural texture modification system 106 can order the texture color parameters based on brightness values and/or brightness characteristics (e.g., greatest to least and/or least to greatest) and utilize the ordered list of the texture color parameters as the ordered list of texture color parameters. Then, the procedural texture modification system 106 can pair the ordered list of the texture color parameters to colors from a color palette (e.g., a color palette scheduled based on color space characteristics).

Additionally, as an example, the procedural texture modification system 106 can pair one or more colors from a color palette to one or more texture color parameters based on user (or system) specified settings. For example, the procedural texture modification system 106 can identify settings included with the target procedural texture (e.g., settings created during the creation of the texture) that define an order in which to pair texture color parameters to color palettes. For instance, the procedural texture modification system 106 can identify settings included with the target procedural texture that define an ordered list of distinctive texture color parameters and/or zones (or pixels) in the target procedural texture that correspond to those distinctive texture color parameters. Then, the procedural texture modification system 106 can pair the ordered list of the texture color parameters to colors from a color palette (e.g., a scheduled color palette).

Moreover, as an example, the procedural texture modification system 106 can pair one or more colors from a color palette to one or more texture color parameters based on an order of discovery. In particular, the procedural texture modification system 106 can utilize the order in which the distinctive texture color parameters were identified from the target procedural texture in accordance with one or more embodiments herein to generate an ordered list of texture color parameters. Then, the procedural texture modification system 106 can pair the ordered list of the texture color parameters to colors from a color palette (e.g., a color palette scheduled based on an order of discovery).

Additionally, as an example, the procedural texture modification system 106 can pair one or more colors from a color palette to one or more texture color parameters based on distances between the colors and the texture color parameters. For instance, the procedural texture modification system 106 can determine distance values between each of the colors from the color palette to each of the identified texture color parameters perform (e.g., using a CIELAB Delta E 2000 calculation between the colors and the texture color parameters). Then, the procedural texture modification system 106 can pair the colors to the texture color parameters by identifying the texture color parameters and color combinations with the lowest distance values (e.g., the most similar).

Furthermore, as an example, the procedural texture modification system 106 can pair one or more colors from a color palette to one or more texture color parameters based on manual intervention of a user. For instance, the procedural texture modification system 106 can display a generated color palette for an input image and/or a generated color palette for a target procedural texture. Furthermore, the procedural texture modification system 106 can enable a user to pair one or more colors from the displayed color palette for the input image and one or more texture color parameters from the displayed color palette for a target procedural texture. Indeed, the procedural texture modification system 106 can display a colorized visual representation for the one or more texture color parameters (e.g., as the displayed color palette for the target procedural texture). Then, the procedural texture modification system 106 can pair the texture color parameters to the colors from the color palette according to the user selections.

Although, in one or more examples described above, the procedural texture modification system 106 pairs colors from a color palette to texture color parameters of a target procedural texture according to an order based on the same type of ordering (e.g., based on representativeness, color space characteristics, etc.), the procedural texture modification system 106 can utilize any combination of ordering approaches to pair the colors to the texture color parameters. For instance, the procedural texture modification system 106 can order the color palette according to a color space characteristic and order the texture color parameters according to representativeness. Then, the procedural texture modification system 106 can pair the texture color parameters to the colors from the color palette according to such ordering using different combinations of ordering approaches.

Furthermore, the procedural texture modification system 106 can pair one or more colors from a color palette to one or more texture color parameters when the colors from the color palette include a different amount of colors compared to the texture color parameters identified from a target procedural texture. For instance, the procedural texture modification system 106 can pair the first occurring colors (e.g., from a scheduled color palette) to the first occurring texture color parameters (e.g., from an ordered list of texture color parameters) until no more colors and/or texture color parameters are available to pair.

Indeed, as mentioned above, the procedural texture modification system 106 can apply one or more colors from a color palette to a target procedural texture. For example, the procedural texture modification system 106 can apply a color from a color palette to one or more areas corresponding to a distinct color of a target procedural texture (e.g., to conserve the color diversity of the target procedural texture as well as the location of the texture colors). By applying a color from a color palette to one or more areas corresponding to a distinct color of a target procedural texture, the procedural texture modification system 106 can preserve the distinctiveness of one or more zones of the target procedural texture while applying the colors from the color palette. As an example, the procedural texture modification system 106 can apply one or more colors from a color palette to texture color parameters according to a pairing determined between the colors and the texture color parameters. Indeed, the procedural texture modification system 106 can apply a color from a color palette to one or more areas corresponding to a paired texture color parameter from the target procedural texture.

As an example, the procedural texture modification system 106 can apply colors from a color palette to a target procedural texture by replacing texture color parameters with color parameters corresponding to the colors from the color palette. Indeed, the procedural texture modification system 106 can replace the texture color parameters with the colors from the color palette while preserving other visual properties of the target procedural texture. For example, the procedural texture modification system 106 can apply the colors from the color palette to the target procedural texture while preserving the finish, structure, volume, and/or shading characteristics of the target procedural texture. Moreover, the procedural texture modification system 106 can apply the colors from the color palette to the target procedural texture while preserving material properties of the target procedural texture (e.g., attributes associated with the type of material of the texture). Indeed, the procedural texture modification system 106 can utilize a variety of substitution approaches to apply colors from a color palette to a target procedural texture. Upon applying colors from a color palette to a target procedural texture, the procedural texture modification system 106 can display the modified procedural texture within a user interface for modifying procedural textures as described in greater detail below in reference to FIGS. 7 and 8. Furthermore, although, one or more embodiments herein describe the procedural texture modification system 106 applying colors from a color palette to a target procedural texture, the procedural texture modification system 106 can apply colors from a color palette to a target image in accordance with one or more embodiments herein.

Furthermore, the procedural texture modification system 106 can enable a user to perform user interventions prior to applying colors from a color palette to a target procedural texture. For instance, the procedural texture modification system 106 can enable a user to change a number of colors in a color palette and/or change a number of texture color parameters identified from a target procedural texture. Additionally, the procedural texture modification system 106 can enable a user to reorganize the ordering of colors from a color palette and/or the ordering of texture color parameters identified from a target procedural texture. Moreover, the procedural texture modification system 106 can enable a user to delete one or more colors from a color palette and/or one or more texture color parameters identified from a target procedural texture.

Figure 7:
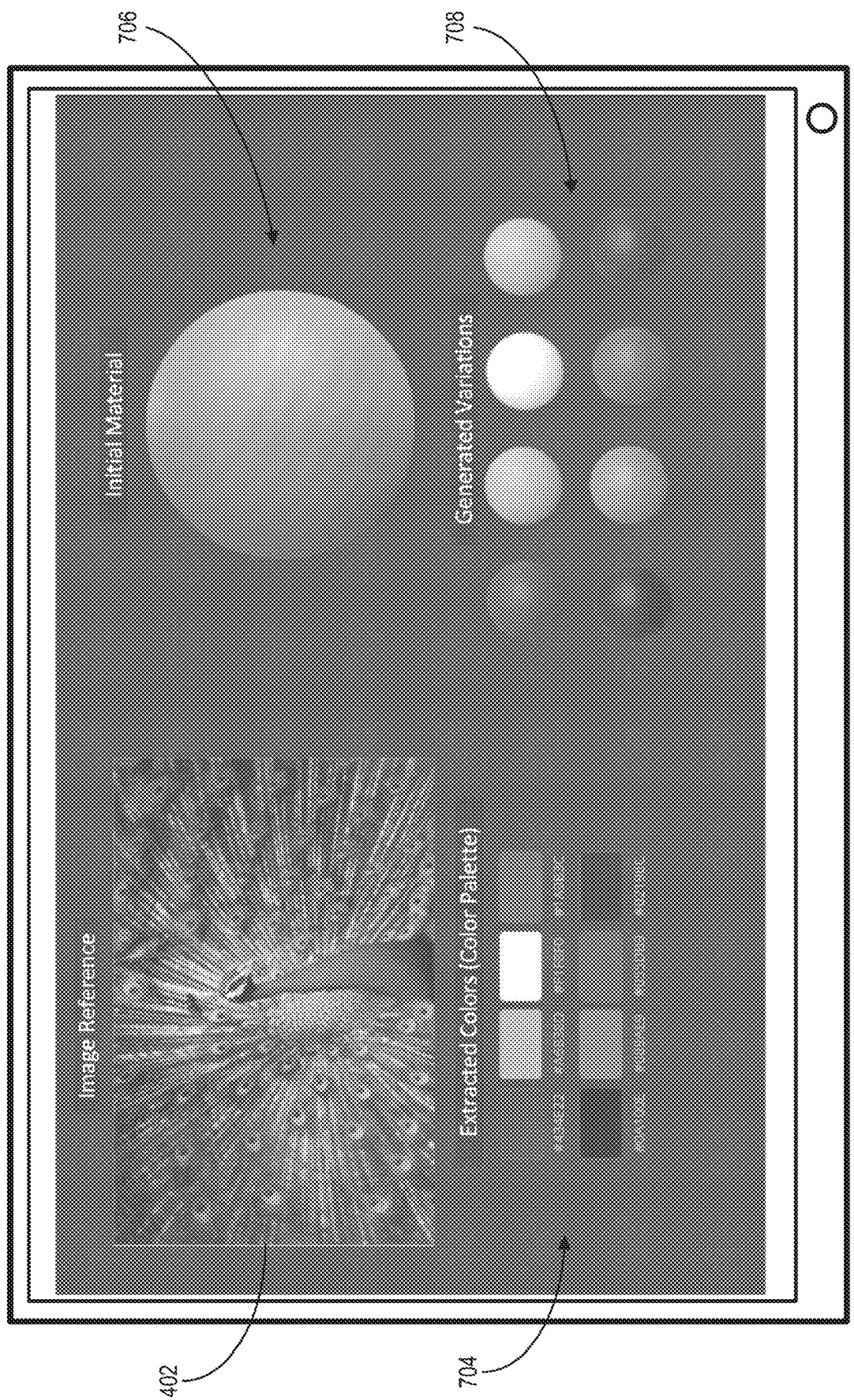
FIG. 7 illustrates a user interface displaying modified textures using a single color application mode in accordance with one or more embodiments.

As mentioned above, the procedural texture modification system 106 can display images, color palettes, and/or modified procedural textures/materials in a user interface for a single color application mode. For example, FIG. 7 illustrates an example user interface for modifying textures/materials based on a single color application mode. As shown in FIG. 7, the procedural texture modification system 106 can display an image 402 (e.g., in a display area for an image reference). Furthermore, as illustrated in FIG. 7, the procedural texture modification system 106 can display a generated color palette 704 (e.g., in a display area for extracted colors and/or a color palette). Additionally, as illustrated in FIG. 7, the procedural texture modification system 106 can display a target procedural material 706 (e.g., a graphical object with a material property) having a target procedural texture (e.g., in a display area for an initial material and/or texture).

Moreover, as shown in FIG. 7, the procedural texture modification system 106 can display one or more modified target procedural materials 708 having one or more modified target procedural textures with applied colors from the color palette 704 in a single color application mode (e.g., in a display area for generated variations). Indeed, as shown in FIG. 7, the procedural texture modification system 106 can apply each color from the color palette 704 to generate each variation for a target procedural material having a target procedural texture for a single color application mode in accordance with one or more embodiments herein. Then, as shown in FIG. 7, the procedural texture modification system 106 can display the modified target procedural materials 708.

Figure 8:
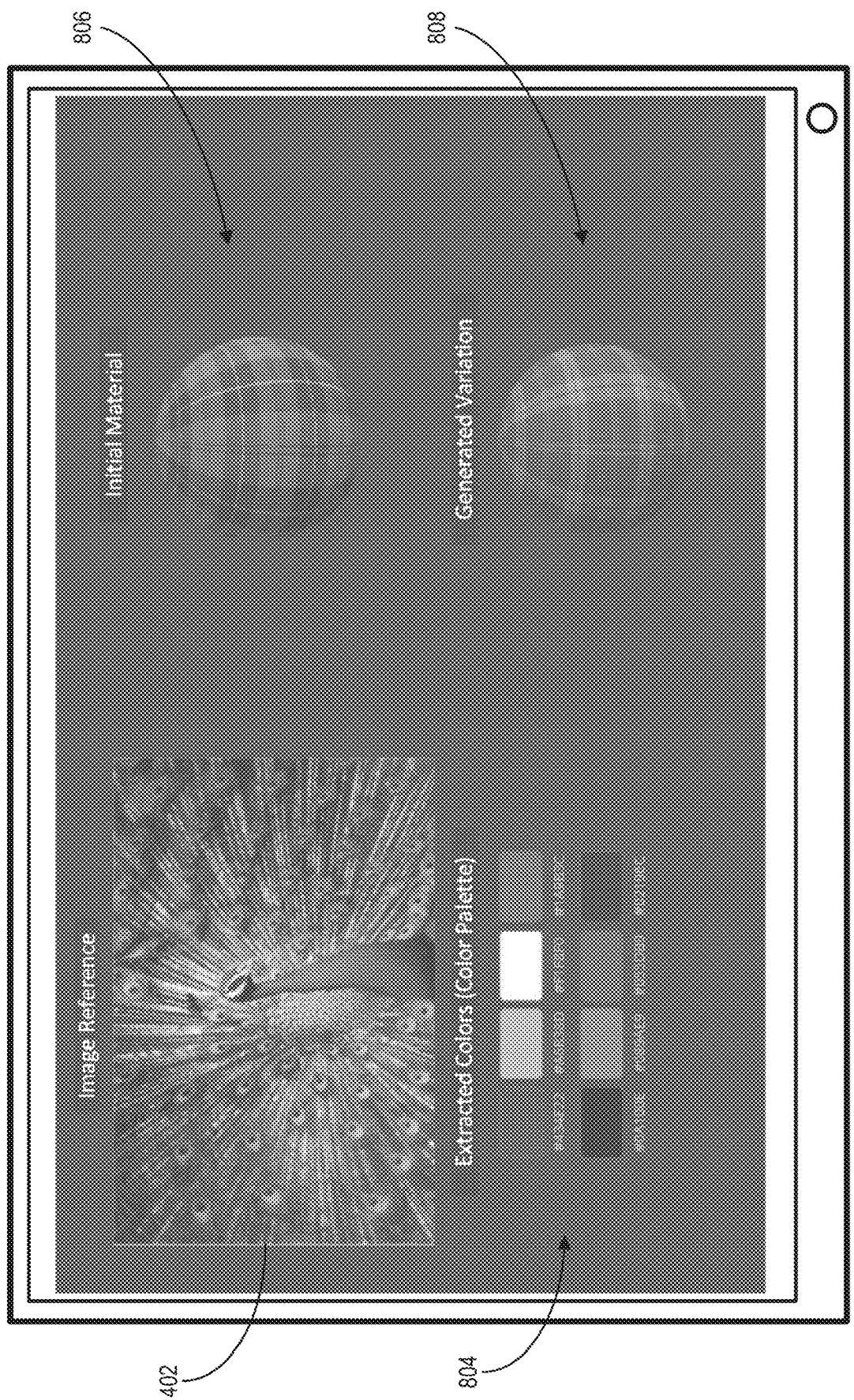
FIG. 8 illustrates a user interface displaying a modified texture using a plurality of colors application mode in accordance with one or more embodiments.

As mentioned above, the procedural texture modification system 106 can display images, color palettes, and/or modified procedural textures/materials in a user interface for a plurality of colors application mode. For example, FIG. 8 illustrates an example user interface for modifying textures/materials based on a plurality of color application mode. As shown in FIG. 8, the procedural texture modification system 106 can display an image 402 (e.g., in a display area for an image reference). Furthermore, as illustrated in FIG. 8, the procedural texture modification system 106 can display a generated color palette 804 (e.g., in a display area for extracted colors and/or a color palette). Additionally, as illustrated in FIG. 8, the procedural texture modification system 106 can display a target procedural material 806 (e.g., a graphical object with a material property) having a target procedural texture (e.g., in a display area for an initial material and/or texture).

Moreover, as shown in FIG. 8, the procedural texture modification system 106 can display a modified target procedural material 808 having a modified target procedural texture with applied colors from the color palette 804 in a plurality of colors application mode (e.g., in a display area for a generated variation). Indeed, as shown in FIG. 8, the procedural texture modification system 106 can apply one or more colors from the color palette 804 to generate a modified target procedural material having a modified target procedural texture for a plurality of colors application mode in accordance with one or more embodiments herein. Then, as shown in FIG. 8, the procedural texture modification system 106 can display the modified target procedural material 808. Although one or more embodiments herein describe the procedural texture modification system 106 displaying a modified target procedural material having a target procedural texture, the procedural texture modification system 106 can display a target procedural texture in accordance with one or more embodiments herein.

Figure 9:
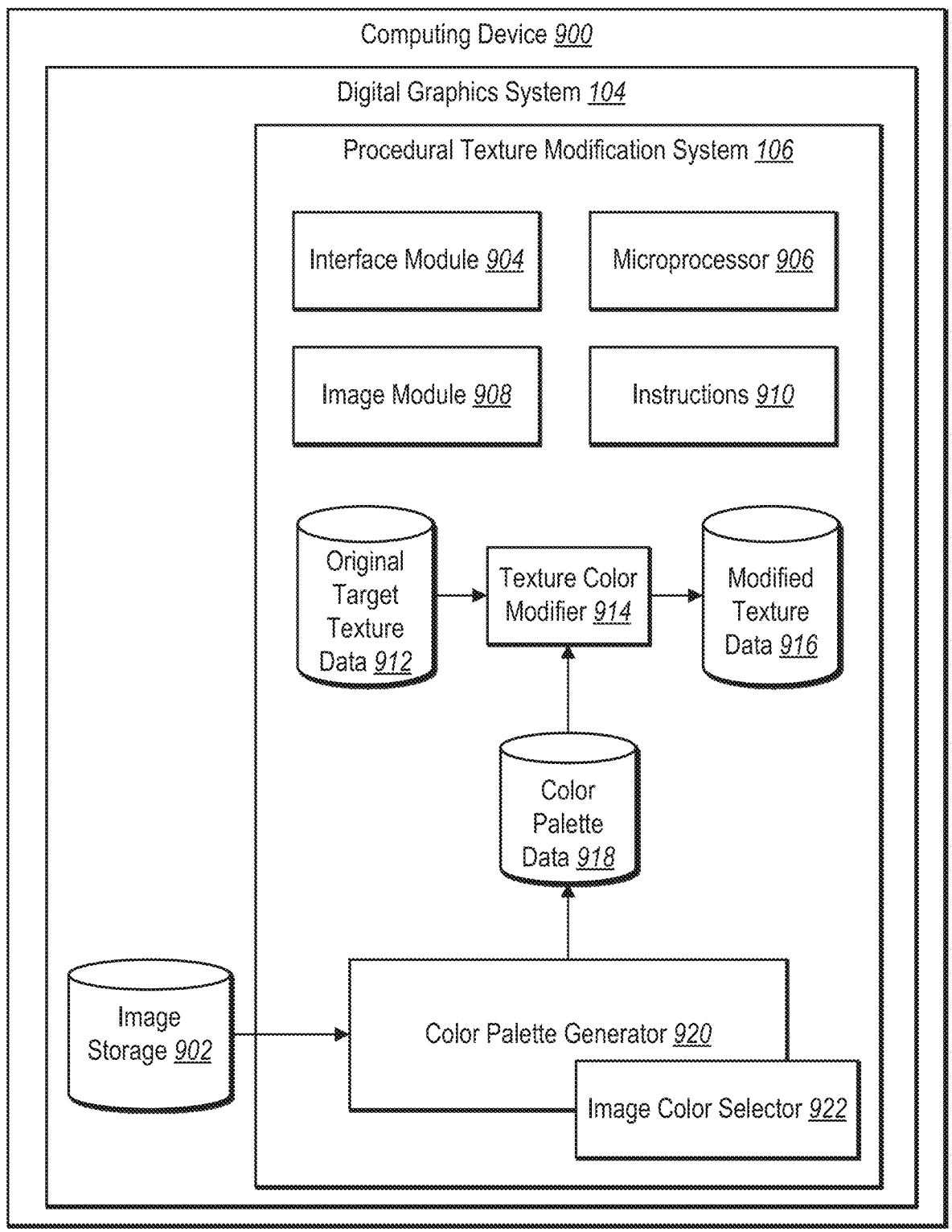
FIG. 9 illustrates a schematic diagram of a procedural texture modification system in accordance with one or more embodiments.

Turning now to FIG. 9, additional detail will be provided regarding components and capabilities of one embodiment of the procedural texture modification system 106. In particular, FIG. 9 illustrates an embodiment of an example procedural texture modification system 106 executed by a computing device 900 (e.g., the server device(s) 102 and/or the client device 110). As shown by the embodiment in FIG. 9, the computing device 900 can include or host the digital graphics system 104 and the procedural texture modification system 106. For example, the procedural texture modification system 106 can include an interface module 904, one or more microprocessors 906, an image module 908, instructions 910, original target texture data 912, a texture color modifier 914, modified texture data 916, color palette data 918, a color palette generator 920, and an image color selector 922.

For instance, as illustrated in FIG. 9, the procedural texture modification system 106 includes the interface module 904 for generating and displaying an interface for modifying textures/materials. For example, the interface module 904 can include an area to display a received digital image (e.g., an inspirational image) so that a user can easily refer to the digital image. The interface module 904 also includes an area to display a color palette generated from the digital image and an area to display a procedural texture/material (for modification). The interface module 904 can display digital images, color palettes, textures, and/or modified textures as described above (e.g., in relation to FIGS. 2A-2C, 4, 5A-5F, 7, and 8).

Additionally, as shown in FIG. 9, the procedural texture modification system 106 can include the image module 908 for receiving and displaying a digital image. Indeed, the image module 908 can receive data from image storage 902 and display the digital image in the image display area of the user interface (e.g., from the interface module 904). Moreover, as shown in FIG. 9, the procedural texture modification system 106 can include the color palette generator 920 for generating a color palette from the colorimetric parameters (or settings) of the digital image (e.g., from the image module 908). As shown in FIG. 9, the procedural texture modification system 106 includes the image color selector 922. Indeed, the image color selector 922 can quantify the pixels of an image, assign a weight to each compartment of the color, alter the weight according to color properties, select the N most important weight colors, and generate a color palette by utilizing the selected N colors. For instance, the color palette generator 920 and/or the image color selector 922 can receive a digital image, receive selections of color property preferences, and/or extract colors from the digital image to generate a color palette as described above (e.g., in relation to FIG. 3).

Furthermore, as shown in FIG. 9, the procedural texture modification system 106 also includes the texture color modifier 914 for applying at least one color of the color palette from the color palette data 918 (e.g., color palette data generated by the color palette generator 920 such as color property preference data and/or color setting or parameter data) on a target procedural texture from the original target texture data 912 (e.g., a target procedural texture/material and/or texture color parameter) to obtain the modified texture data 916 (e.g., the modified target procedural texture/material having at least one color of the color palette and/or modified texture color parameters). For example, the texture color modifier 914 can apply colors from a color palette to a target procedural texture using a single color and/or a plurality of colors application mode as described above (e.g., in relation to FIG. 6).

Furthermore, in reference to FIG. 9, the implementation of various modules of a procedural texture modification system can be achieved by use of processor instructions or processor commands that enable the modules to perform the operation and/or operations related to the modules. For instance, processor instructions can be in the form of one or more software packages and/or software modules implemented by the one or more microprocessors 906. Furthermore, the module (or modules) and/or the software provided in a computer program product including a recording medium (or media) that can be used by a computer and including programmed code readable by a computer integrated in the medium (or media) can allow a software application to run on a computer or other device having one or more microprocessors such as a tablet (and/or other mobile device, laptop, and/or desktop computer).

Furthermore, according to various design variants, the microprocessor 906, as well as the working memory with instructions 910 can be centralized for all the modules or be externally arranged, with connection to the different modules, or be distributed locally in such a way that one or more modules can each have a microprocessor and/or a memory including instructions.

Each of the components 902-922 of the computing device 900 (e.g., the computing device 900 implementing the procedural texture modification system 106), as shown in FIG. 9, may be in communication with one another using any suitable communication technologies. It will be recognized that although components 902-922 of the computing device 900 are shown to be separate in FIG. 9, any of components 902-922 may be combined into fewer components, such as into a single facility or module, divided into more components, or configured into different components as may serve a particular embodiment.

The components 902-922 of the computing device 900 can comprise software, hardware, or both. For example, the components 902-922 can comprise one or more instructions stored on a computer-readable storage medium and executable by processors of one or more computing devices. When executed by the one or more processors, the computer-executable instructions of the procedural texture modification system 106 (e.g., via the computing device 900) can cause a client device and/or a server device to perform the methods described herein. Alternatively, the components 902-922 and their corresponding elements can comprise hardware, such as a special purpose processing device to perform a certain function or group of functions. Additionally, the components 902-922 can comprise a combination of computer-executable instructions and hardware.

Furthermore, the components 902-922 of the procedural texture modification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-922 may be implemented as a stand-alone application, such as a desktop or mobile application. Furthermore, the components 902-922 may be implemented as one or more web-based applications hosted on a remote server. The components 902-922 may also be implemented in a suite of mobile device applications or "apps." To illustrate, the components 902-922 may be implemented in an application, including but not limited to, ADOBE®

DOCUMENT CLOUD, ADOBE® CAPTIVATE® PRIME, ADOBE® ANALYTICS CLOUD, ADOBE® ANALYTICS, ADOBE® AUDIENCE MANAGER, ADOBE® CAMPAIGN, ADOBE® EXPERIENCE MANAGER, ADOBE® TARGET, SUBSTANCE ALCHEMIST, SUBSTANCE PAINTER, SUBSTANCE DESIGNER, SUBSTANCE SOURCE, SUBSTANCE B2M, AND SUBSTANCE PLAYER. "ADOBE," "ADOBE® DOCUMENT CLOUD," "ADOBE CAPTIVATE PRIME," "ADOBE ANALYTICS CLOUD," "ADOBE ANALYTICS," "ADOBE AUDIENCE MANAGER," "ADOBE CAMPAIGN," "ADOBE EXPERIENCE MANAGER," "ADOBE TARGET," "SUBSTANCE ALCHEMIST," "SUBSTANCE PAINTER," "SUBSTANCE DESIGNER," "SUBSTANCE SOURCE," "SUBSTANCE B2M," AND "SUBSTANCE PLAYER" are either registered trademarks or trademarks of Adobe Inc. in the United States and/or other countries.

Figure 10:
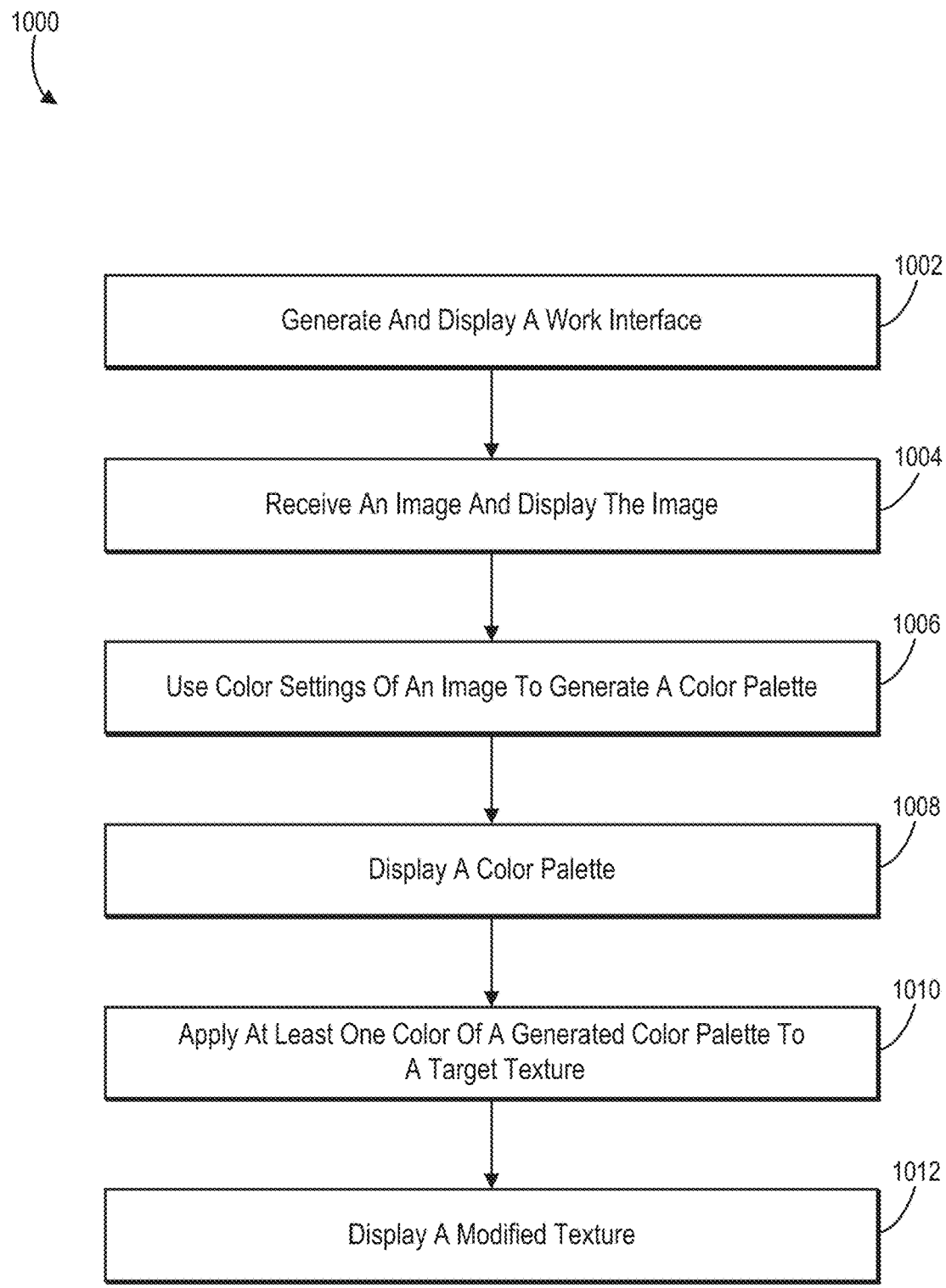
FIG. 10 illustrates a flowchart of a series of acts for extracting one or more colors from an input image to generate a color palette and applying colors from the color palette to a target procedural texture in accordance with one or more embodiments.
Figure 11:
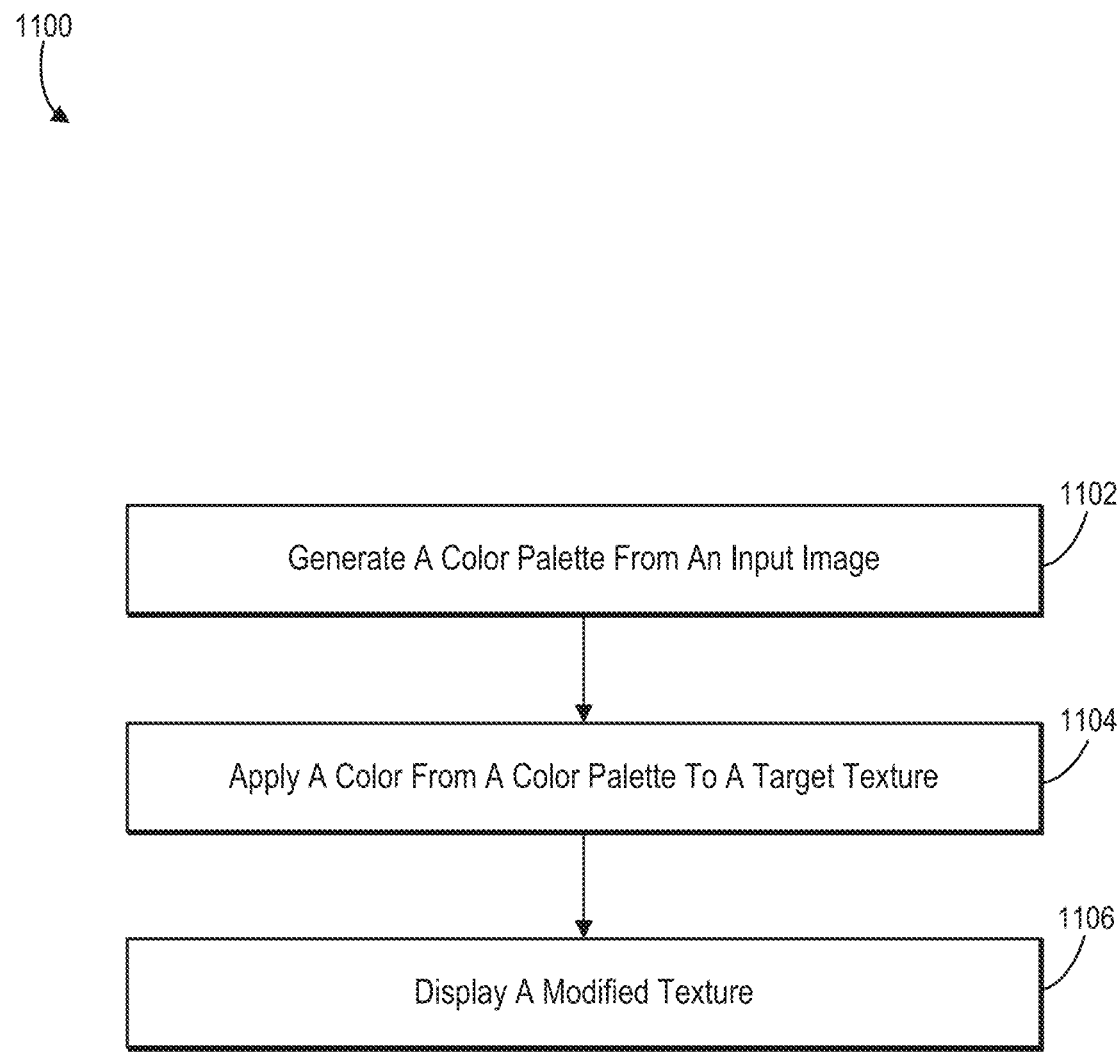
FIG. 11 illustrates a flowchart of another series of acts for extracting one or more colors from an input image to generate a color palette and applying colors from the color palette to a target procedural texture in accordance with one or more embodiments.

FIGS. 1-9, the corresponding text, and the examples provide a number of different methods, systems, devices, and non-transitory computer-readable media of the procedural texture modification system 106. In addition to the foregoing, one or more embodiments can also be described in terms of flowcharts comprising acts for accomplishing a particular result, as shown in FIGS. 10 and 11. FIGS. 10 and 11 may be performed with more or fewer acts. Further, the acts may be performed in differing orders. Additionally, the acts described herein may be repeated or performed in parallel with one another or parallel with different instances of the same or similar acts.

As mentioned above, FIG. 10 illustrates a flowchart of a series of acts 1000 for extracting one or more colors from an input image to generate a color palette and applying colors from the color palette to a target procedural texture in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As illustrated in FIG. 10, the series of acts 1000 includes an act 1002 of generating and displaying a work interface. In particular, the act 1002 can include generating a work interface with a display area for the display of a digital image, a display area for the display of a color palette, and a display area for the display of a procedural texture (that can be modified).

As illustrated in FIG. 10, the series of acts 1000 includes an act 1004 of receiving an image and displaying the image. In particular, the act 1004 can include receiving an image and displaying the image in a display area for the image.

As illustrated in FIG. 10, the series of acts 1000 includes an act 1006 of using color settings (or parameters) of an image to generate a color palette. Furthermore, the act 1006 can include preselecting colors representative of an image to generate a color palette. Moreover, the act 1006 can include selecting colors representative of an image by quantifying pixels of the image to create color compartments, assigning a weight to each color compartment, altering the weight according to color properties, selecting N colors having the most important weight, and generating a color palette according to the N colors. Additionally, the act 1006 can include excluding a color neighbor after selecting a color for a color palette.

As illustrated in FIG. 10, the series of acts 1000 includes an act 1008 of displaying a color palette. In particular, the act 1008 can include displaying a generated color palette in a display area for a palette color.

As illustrated in FIG. 10, the series of acts 1000 includes an act 1010 of applying at least one color of a generated palette to a target procedural texture. Furthermore, the act 1010 can include proposing to a user via a working interface at least two modes of color application on a target procedural texture. For example, the application modes of colors can include a single color application mode and a plurality of colors application mode. Moreover, the act 1010 can include receiving a selection of one of the color application modes. Additionally, the act 1010 can include determining a color or colors according to a received color application mode. Furthermore, the act 1010 can include applying a color or colors on a target procedural texture. In addition, the act 1010 can include applying a single color selected from the color palette in the single color application mode.

Furthermore, the act 1010 can include assigning each color of the color palette to a different colorimetric parameter of a target procedural texture in the plurality of colors application mode. Additionally, the act 1010 can include identifying colorimetric parameters having distinctive characteristics from a target procedural texture. Moreover, the act 1010 can include pairing a separate color from the color palette to each of the identified distinctive colorimetric parameters. As illustrated in FIG. 10, the series of acts 1000 includes an act 1012 of displaying a modified texture. In particular, the act 1012 can include displaying a modified texture with an applied color or colors.

As mentioned above, FIG. 11 illustrates a flowchart of a series of acts 1100 for extracting one or more colors from an input image to generate a color palette and applying colors from the color palette to a target procedural texture in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As illustrated in FIG. 11, the series of acts 1100 includes an act 1102 of generating a color palette from an input image. In particular, the act 1102 can include extracting one or more colors from an input image to generate a color palette. Furthermore, the act 1102 can include receiving an input image (e.g., in a graphical user interface). Additionally, the act 1102 can include quantifying pixels of an input image into color compartments. The act 1102 can also include assigning weights to color compartments. Furthermore, the act 1102 can include altering weights of color compartments based on a color property preference. For example, a color property preference can include a selection of a color palette type. Additionally, as an example, a color palette type can include a representative color palette, a pure color palette, a bright color palette, a pastel color palette, a deep color palette, or a dark color palette. Moreover, the act 1102 can include extracting one or more colors from an input image to generate a color palette by selecting the one or more colors based on weights corresponding to color compartments. Additionally, the act 1102 can also include selecting one or more colors based on weights corresponding to color compartments and color similarities between the color compartments.

Furthermore, the act 1102 can include identifying a first color compartment corresponding to a max weight from weights (e.g., weights of color compartments) and/or selecting one or more colors by selecting a first color based on the first color compartment. Additionally, the act 1102 can include determining distances between a first color from a first color compartment and color compartments. For example, distances can include a measure of color similarities between a first color compartment and color compartments. Moreover, the act 1102 can include altering weights of color compartments based on distances to generate additional weights. The act 1102 can also include identifying a second color compartment corresponding to a max weight from additional weights (e.g., additional weights of color compartments) and/or selecting one or more colors by selecting a second color based on the second color compartment.

In addition to (or in the alternative to) the acts above, the procedural texture modification system 106 can also perform a step for generating a color palette from one or more colors of the input image and a color property preference selection. For example, the acts and algorithms described above in relation to FIG. 3 (e.g., the acts 302-314) can comprise the corresponding acts and algorithms (i.e., structures) for performing a step for generating a color palette from one or more colors of the input image and a color property preference selection.

As illustrated in FIG. 11, the series of acts 1100 includes an act 1104 of applying a color from a color palette to a target procedural texture. In particular, the act 1104 can include applying at least one color from a color palette to a target procedural texture (and/or to a target image). Furthermore, the act 1104 can include identifying at least one texture color parameter corresponding to a target procedural texture (e.g., based on a selection of a plurality of colors application mode). Additionally, the act 1104 can include applying at least one color from a color palette to a target procedural texture by applying the at least one color from the color palette to at least one texture color parameter.

Moreover, the act 1104 can include pairing texture color parameters from an identified at least one texture color parameter corresponding to a target procedural texture to colors from at least one color from a color palette. The act 1104 can also include applying at least one color from a color palette to a target procedural texture by applying the at least one color from the color palette to at least one texture color parameter based on pairings of texture color parameters to colors from the at least one color from the color palette. Additionally, the act 1104 can include ordering colors from at least one color from a color palette into an ordered list of colors based on a color space characteristic. For example, a color space characteristic can include hue characteristics or brightness characteristics. Furthermore, the act 1104 can include ordering texture color parameters from an identified at least one texture color parameter into an ordered list of texture color parameters based on a color space characteristic. For instance, a texture color parameter can include a colorimetric parameter of the target procedural texture. Moreover, the act 1104 can include ordering colors from at least one color from a color palette into an ordered list of colors based on color representativeness of the colors within an input image. Additionally, the act 1104 can include ordering texture color parameters from an identified at least one texture color parameter into an ordered list of texture color parameters based on color representativeness of the texture color parameters within a target procedural texture. The act 1104 can also include pairing texture color parameters to colors from at least one color from a color palette by pairing an ordered list of texture color parameters to an ordered list of colors (e.g., from the color palette).

In addition to (or in the alternative to) the acts above, the procedural texture modification system 106 can also perform a step for applying at least one color from a color palette to a target procedural texture. For example, the acts and algorithms described above in relation to FIG. 6 (e.g., the acts 602-614) can comprise the corresponding acts and algorithms (i.e., structures) for performing a step for applying at least one color from the color palette to a target procedural texture.

As illustrated in FIG. 11, the series of acts 1100 includes an act 1106 of displaying a modified texture. In particular, the act 1106 can include displaying a target procedural texture (and/or a target image) with an applied at least one color from a color palette in a graphical user interface (for modifying textures). The act 1106 can also include displaying a colorized visual representation of a color palette in a graphical user interface (for modifying textures). Furthermore, the act 1106 can include displaying an input image in a graphical user interface (for modifying textures).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
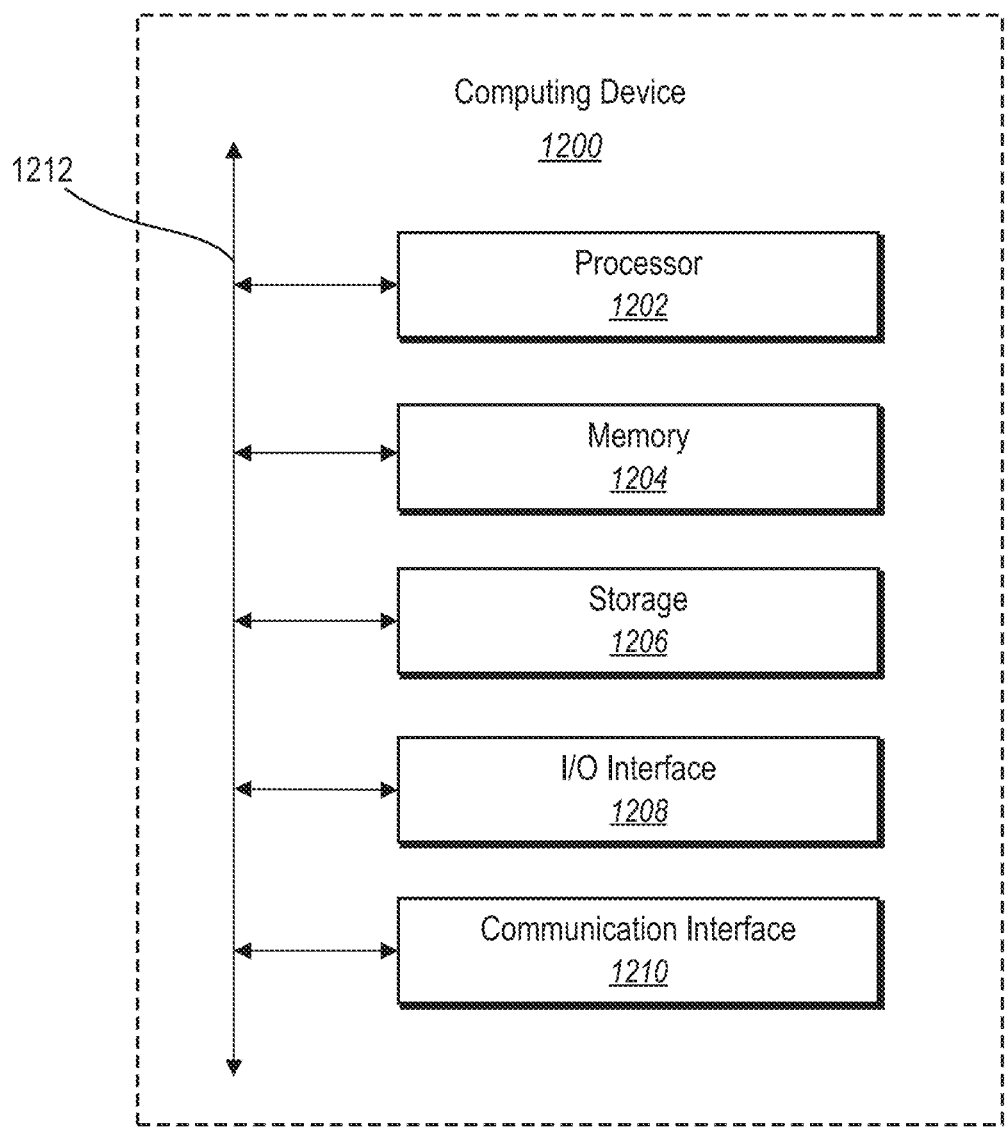
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 900, server device(s) 102, and client device 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to perform operations comprising:
   receiving an input image;
   extracting colors from the input image to generate a color palette;
   ordering the colors from the color palette into an ordered list of colors based on color representativeness of colors determined utilizing pixel counts for each of the colors from within the input image;
   identifying an ordered list of texture color parameters from texture color parameters corresponding to a target procedural texture, wherein the ordered list of texture color parameters is based on color representativeness of texture color parameters determined utilizing pixel counts for each of the texture color parameters from within the target procedural texture;
   applying the colors from the color palette from the input image to the target procedural texture by replacing one or more texture color parameters from the target procedural texture with the colors from the color palette utilizing a mapping of the ordered list of texture color parameters to the ordered list of colors; and
   displaying the target procedural texture with the applied colors from the color palette in a graphical user interface.

2. The non-transitory computer-readable medium of claim 1, further comprising instructions that, when executed by the at least one processor, cause the computing device to perform operations comprising:
   quantifying pixels of the input image into color compartments;
   assigning weights to the color compartments;
   altering the weights of the color compartments based on a color property preference; and
   extracting the colors from the input image to generate the color palette by selecting the colors based on the weights corresponding to the color compartments.

3. The non-transitory computer-readable medium of claim 2, further comprising instructions that, when executed by the at least one processor, cause the computing device to perform operations comprising:
   identifying a first color compartment corresponding to a max weight from the weights; and
   wherein selecting the colors comprises selecting a first color based on the first color compartment.

4. The non-transitory computer-readable medium of claim 3, further comprising instructions that, when executed by the at least one processor, cause the computing device to perform operations comprising:
   determining distances between the first color from the first color compartment and the color compartments, wherein the distances comprise a measure of color similarities between the first color compartment and the color compartments;
   altering the weights of the color compartments based on the distances to generate additional weights;
   identifying a second color compartment corresponding to a max weight from the additional weights; and
   wherein selecting the colors further comprises selecting a second color based on the second color compartment.

5. The non-transitory computer-readable medium of claim 2, wherein the color property preference comprises a selection of a color palette type, the color palette type comprising a representative color palette, a pure color palette, a bright color palette, a pastel color palette, a deep color palette, or a dark color palette.

6. The non-transitory computer-readable medium of claim 1, wherein the texture color parameters comprise colorimetric parameters of the target procedural texture.

7. The non-transitory computer-readable medium of claim 1, further comprising instructions that, when executed by the at least one processor, cause the computing device to perform operations comprising ordering the colors from the color palette into the ordered list of colors based on the color representativeness of colors within the input image by:

determining a number of pixels, from within the input image, associated with each color from the colors; and utilizing the number of pixels associated with each color to order the colors into the ordered list of colors.

8. The non-transitory computer-readable medium of claim 1, further comprising instructions that, when executed by the at least one processor, cause the computing device to perform operations comprising ordering the texture color parameters corresponding to the target procedural texture based on the color representativeness of the texture color parameters within the target procedural texture by:

determining a number of pixels, from within the target procedural texture, associated with each texture color parameter from the texture color parameters; and utilizing the number of pixels associated with each texture color parameter to order the texture color parameters into the ordered list of texture color parameters.

9. The non-transitory computer-readable medium of claim 1, further comprising instructions that, when executed by the at least one processor, cause the computing device to perform operations comprising displaying a colorized visual representation of the color palette in the graphical user interface for modifying textures.

10. A system comprising:

one or more memory devices comprising an input image and a target procedural texture; and one or more processors configured to cause the system to:

extract colors from the input image to generate a color palette by:

quantifying pixels of the input image into color compartments;

assigning weights to the color compartments;

altering the weights of the color compartments based on a color property preference; and selecting the colors based on the weights corresponding to the color compartments and color similarities between the color compartments;

order the colors from the color palette into an ordered list of colors by utilizing a pixel count based color representativeness of colors within the input image;

identify an ordered list of texture color parameters from texture color parameters corresponding to the target procedural texture, wherein the ordered list of texture color parameters is ordered utilizing a pixel count based color representativeness of texture color parameters of the target procedural texture; and apply the colors from the color palette from the input image to the target procedural texture by replacing one or more texture color parameters from the target procedural texture with the colors from the color palette utilizing a mapping of the ordered list of texture color parameters to the ordered list of colors.

11. The system of claim 10, wherein the one or more processors are further configured to cause the system to:

identify a first color compartment corresponding to a max weight from the weights; and wherein selecting the colors comprises selecting a first color based on the first color compartment.

12. The system of claim 11, wherein the one or more processors are further configured to cause the system to:

determine distances between the first color from the first color compartment and the color compartments, wherein the distances comprise a measure of color similarities between the first color compartment and the color compartments;

alter the weights of the color compartments based on the distances to generate additional weights;

identify a second color compartment corresponding to a max weight from the additional weights; and wherein selecting the colors further comprises selecting a second color based on the second color compartment.

13. The system of claim 10, wherein the color property preference comprises a selection of a color palette type, the color palette type comprising a representative color palette, a pure color palette, a bright color palette, a pastel color palette, a deep color palette, or a dark color palette.

14. The system of claim 10, wherein the texture color parameters comprise colorimetric parameters of the target procedural texture.

15. The system of claim 10, wherein the one or more processors are further configured to cause the system to order the colors from the color palette into the ordered list of colors by ordering color space characteristic values corresponding to each color from the colors.

16. The system of claim 15, wherein the color space characteristic comprises a hue characteristic or a brightness characteristic.

17. The system of claim 10, wherein the one or more processors are further configured to cause the system to display the target procedural texture with the applied colors from the color palette in a graphical user interface.

18. A computer-implemented method comprising:

receiving an input image;

extracting colors from the input image to generate a color palette;

ordering the colors from the color palette into an ordered list of colors based on color representativeness of colors determined utilizing pixel counts for each of the colors from within the input image;

identifying an ordered list of texture color parameters from texture color parameters corresponding to a target procedural texture, wherein the ordered list of texture color parameters is based on color representativeness of texture color parameters determined utilizing pixel counts for each of the texture color parameters from within the target procedural texture;

applying the colors from the color palette from the input image to the target procedural texture by replacing one or more texture color parameters from the target procedural texture with the colors from the color palette utilizing a mapping of the ordered list of texture color parameters to the ordered list of colors; and displaying the target procedural texture with the applied colors from the color palette in a graphical user interface.

19. The computer-implemented method of claim 18, further comprising utilizing weights of color compartments based on a color property preference selection to extract the colors from the input image, wherein the color property preference selection comprises a selection of a color palette type, the color palette type comprising a representative color palette, a pure color palette, a bright color palette, a pastel color palette, a deep color palette, or a dark color palette.

20. The computer-implemented method of claim 18, further comprising:

displaying the input image in the graphical user interface; and displaying a colorized visual representation of the ordered color palette in the graphical user interface.

* * * * *